(12) United States Patent
Shanbhogue et al.

(10) Patent No.: US 11,934,843 B2
(45) Date of Patent: Mar. 19, 2024

(54) SECURE ARBITRATION MODE TO BUILD AND OPERATE WITHIN TRUST DOMAIN EXTENSIONS

(71) Applicant: Intel Corporation, Santa Clara, CA (US)

(72) Inventors: Vedvyas Shanbhogue, Austin, TX (US); Ravi L. Sahita, Portland, OR (US); Vincent Scarlata, Beaverton, OR (US); Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/307,650

(22) Filed: Apr. 26, 2023

(65) Prior Publication Data
US 2023/0409340 A1  Dec. 21, 2023

Related U.S. Application Data

(63) Continuation of application No. 16/367,527, filed on Mar. 28, 2019, now Pat. No. 11,669,335.

(51) Int. Cl.
*G06F 9/44* (2018.01)
*G06F 9/4401* (2018.01)
(Continued)

(52) U.S. Cl.
CPC ........ *G06F 9/4403* (2013.01); *G06F 9/45558* (2013.01); *G06F 12/1009* (2013.01);
(Continued)

(58) Field of Classification Search
CPC ....... G06F 9/45558; G06F 2009/45579; G06F 9/4812; G06F 2009/45575;
(Continued)

(56) References Cited

U.S. PATENT DOCUMENTS

| 9,858,167 | B2 * | 1/2018 | Neiger | G06F 9/455 |
| 2009/0307770 | A1 * | 12/2009 | Harris | G06F 21/52 |
| | | | | 714/45 |

(Continued)

FOREIGN PATENT DOCUMENTS

EP  3457311 A1  3/2019

OTHER PUBLICATIONS

European Search Report and Search Opinion, EP App. No. 20156144.6, dated Jul. 8, 2020, 8 pages.
(Continued)

*Primary Examiner* — Dao Q Ho
(74) *Attorney, Agent, or Firm* — Nicholson DeVos Webster & Elliott LLP

(57) ABSTRACT

A processor includes a range register to store information that identifies a reserved range of memory associated with a secure arbitration mode (SEAM) and a core coupled to the range register. The core includes security logic to unlock the range register on a logical processor, of the processor core, that is to initiate the SEAM. The logical processor is to, via execution of the security logic, store, in the reserved range, a SEAM module and a manifest associated with the SEAM module, wherein the SEAM module supports execution of one or more trust domains; initialize a SEAM virtual machine control structure (VMCS) within the reserved range of the memory that is to control state transitions between a virtual machine monitor (VMM) and the SEAM module; and authenticate the SEAM module using a manifest signature of the manifest.

24 Claims, 24 Drawing Sheets

(51) Int. Cl.
  *G06F 9/455* (2018.01)
  *G06F 12/1009* (2016.01)
  *G06F 21/78* (2013.01)
  *H04L 9/30* (2006.01)
  *H04L 9/32* (2006.01)

(52) U.S. Cl.
  CPC ............... *G06F 21/78* (2013.01); *H04L 9/30* (2013.01); *H04L 9/32* (2013.01); *G06F 2009/45579* (2013.01); *G06F 2009/45583* (2013.01); *G06F 2009/45591* (2013.01); *G06F 2009/45595* (2013.01)

(58) Field of Classification Search
  CPC . G06F 2009/45583; G06F 2009/45591; G06F 2009/45595; G06F 12/1009; G06F 9/4403; H04L 9/30; H04L 9/32
  See application file for complete search history.

(56) References Cited

U.S. PATENT DOCUMENTS

| | | | | |
|---|---|---|---|---|
| 2016/0364341 | A1* | 12/2016 | Banginwar | G06F 21/57 |
| 2018/0060099 | A1* | 3/2018 | Shanbhogue | G06F 13/102 |
| 2018/0067866 | A1* | 3/2018 | Shanbhogue | G06F 11/0787 |
| 2018/0357093 | A1* | 12/2018 | Cong | G06F 12/109 |
| 2019/0042296 | A1* | 2/2019 | Dewan | G06F 9/30018 |
| 2019/0340365 | A1* | 11/2019 | Nijhawan | G06F 21/44 |
| 2020/0341792 | A1* | 10/2020 | Tsirkin | G06F 9/45533 |

OTHER PUBLICATIONS

Final Office Action, U.S. Appl. No. 16/367,527, dated Nov. 18, 2022, 8 pages.
Non-Final Office Action, U.S. Appl. No. 16/367,527, dated May 24, 2022, 14 pages.
Notice of Allowance, U.S. Appl. No. 16/367,527, dated Feb. 8, 2023, 9 pages.
Requirement for Restriction/Election, U.S. Appl. No. 16/367,527, dated Mar. 3, 2022, 7 pages.
Intention to Grant, EP App. No. 20156144.6, dated Jan. 25, 2024, 06 pages.
Office Action, EP App. No. 20156144.6, dated Nov. 23, 2023, 04 pages.

* cited by examiner

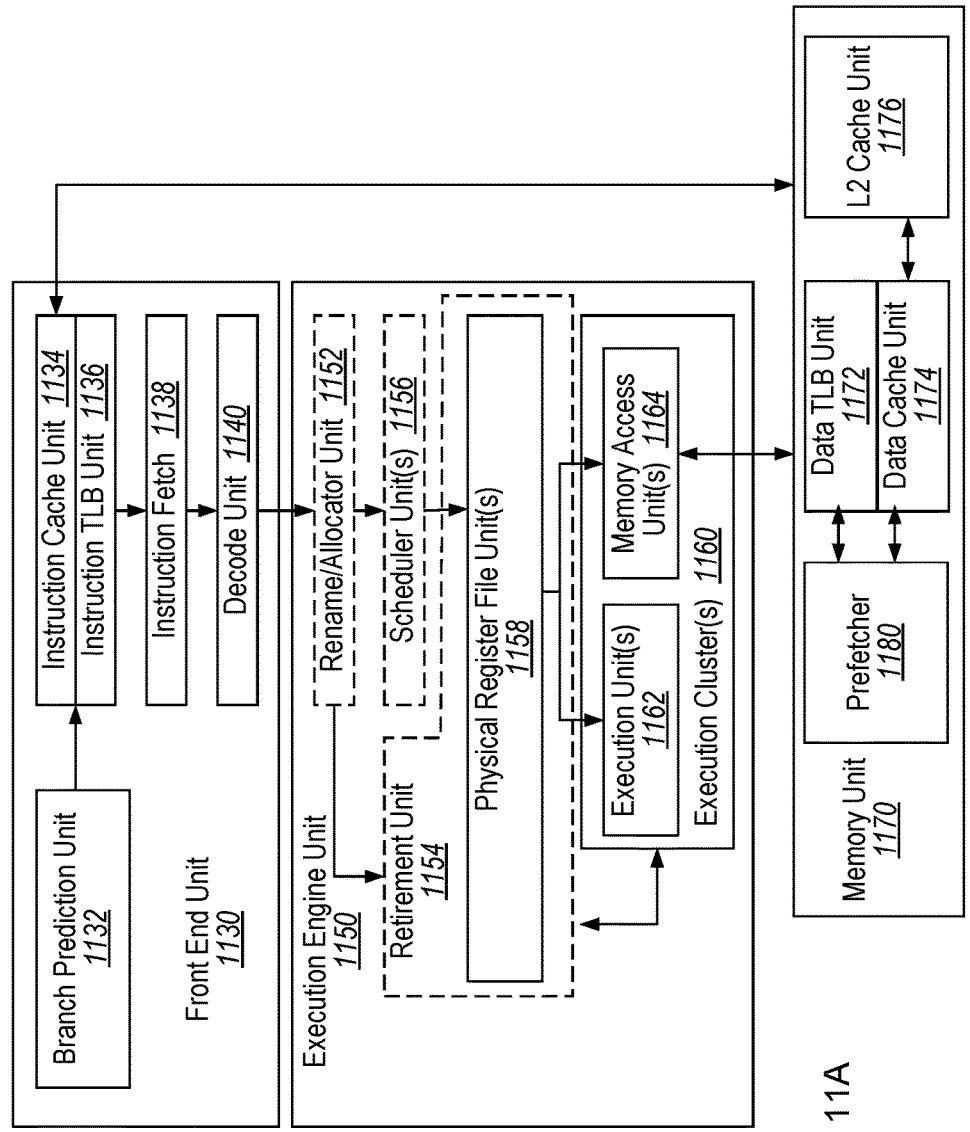
FIGURE 11B
FIGURE 11A

SECURE ARBITRATION MODE TO BUILD AND OPERATE WITHIN TRUST DOMAIN EXTENSIONS

TECHNICAL FIELD

The disclosure pertains to computer systems, and more specifically, to a secure arbitration mode of a computing device to build and operate within trust domain extensions.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing, and the like to retrieve data from memory. This data from memory could include sensitive data for example, privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

BRIEF DESCRIPTION OF THE DRAWINGS

FIG. 11A is a block diagram illustrating a micro-architecture for a processor or an integrated circuit that may implement hardware support for a SEAM of a computing device to build and operate within TDX, according to an implementation of the disclosure.

FIG. 11B is a block diagram illustrating an in-order pipeline and a register renaming stage, out-of-order issue/execution pipeline according to one implementation.

DETAILED DESCRIPTION

Figure 1A:
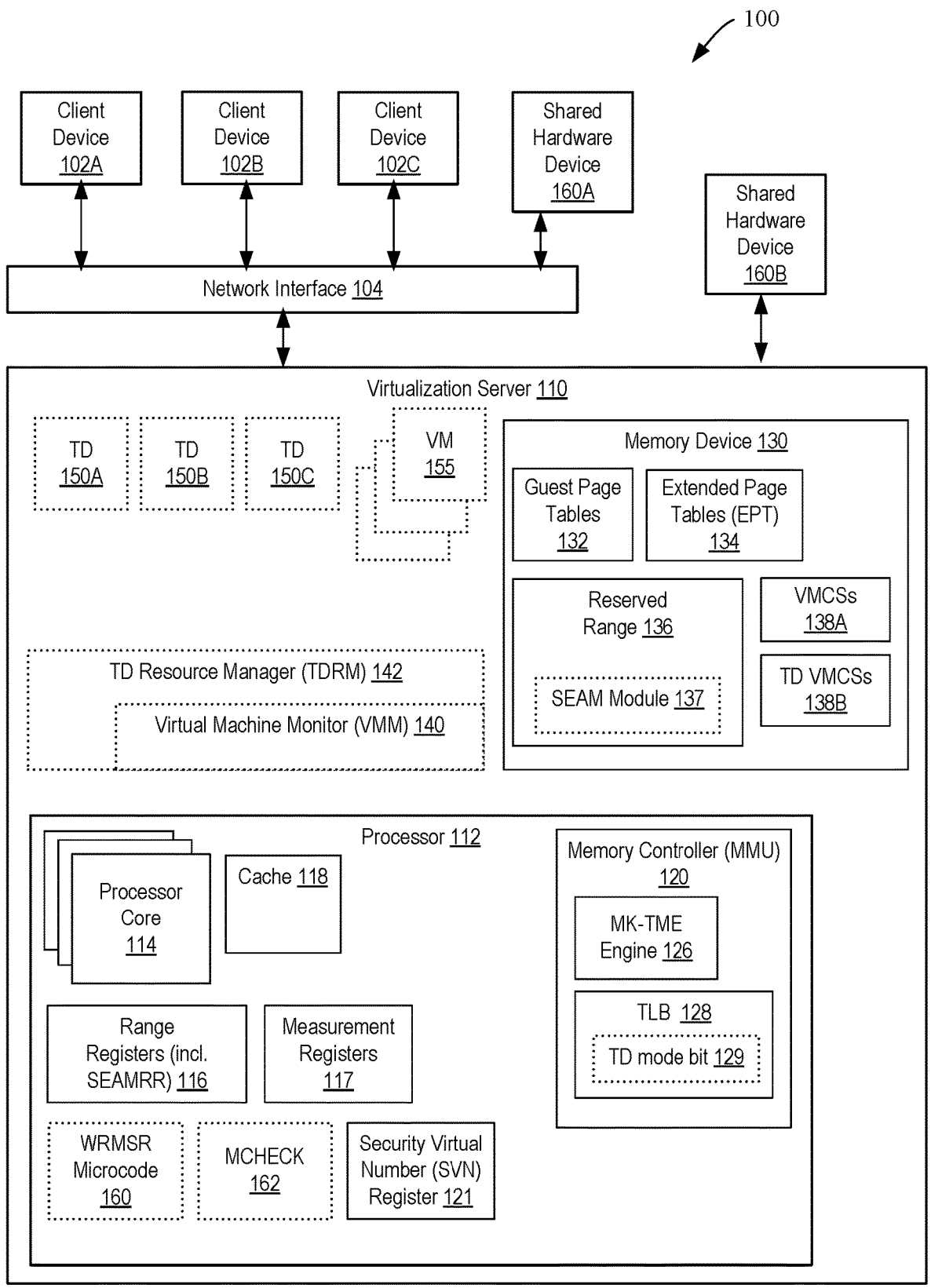
FIG. 1A is a block diagram illustrating an example computing system that includes a processor 112 that supports a secure arbitration mode (SEAM) instruction set architecture (ISA) extension out of which to operate trust domain extensions (TDX).

Processor architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, tenants seek solutions that enable the operation of CSP-provided software outside of a trusted computing base (TCB) of the tenant's software. The TCB of a system refers to a set of hardware, firmware, and/or software components that have an ability to influence the trust for the overall operation of the system.

To provide these protections, the disclosed CSP system may remove the virtual machine monitor (VMM), also known as a hypervisor, as well as other untrusted firmware, software, and devices from the TCB of virtual machines (VMs) that the VMM manages. The VMs are workloads of respective tenants of the CSP. From the perspective of both the CSP and the cloud tenant, both desire confidentiality for the VM workload. To achieve this confidential VM execution, the memory of the VM and the runtime processor state is to be kept confidential, integrity-protected, and reply protected to prevent data exfiltration or tamper-based attacks. The CSP system may deploy trust domain extensions (TDX) to meet these security objectives via use of memory encryption and integrity provided by a memory controller adapted to include a multi-key total memory encryption (MK-TME) engine. MK-TME technology refers to providing, to an operating system or VMM, the capability to use different unique encryption keys to encrypt pages of physical memory associated with different workloads, e.g., different tenants, different applications, different devices, and the like. To support TDX, the MK-TME engine may employ specific keys that can be only used for TDX.

In implementations, TDX includes technology that extends virtual machine extensions (VMX) with a new kind of virtual machine guest called a trust domain (TD). A TD runs in a processor mode that protects the confidentiality of its memory contents and its processor state from other software, including the hosting VMM, unless explicitly shared by the TD itself. To coordinate the above-explained protections, a trust domain resource manager (TDRM) is a VMM software extension that may be deployed for management and support of TDX operation. A VMM that works as the TDRM may launch and manage both TDs and "legacy" VMs. Accordingly, the VMM that works as a TDRM is a full VMM from the legacy VM perspective. In implementations, the TDRM is only restricted with regards to the TDs that the TDRM manages as will be explained.

Secure arbitration mode (SEAM) is an instruction set architecture (ISA) extension to implement TDX. This mode (e.g., SEAM) of the processor may host resource arbitration software (e.g., "SEAM module") that functions as a trust arbiter between the TDRM and the TDs. The SEAM module, which may invoke a SEAM-specific library to execute the SEAM, may manage resource assignments to the TDs. The SEAM module may have access to certain privileged instructions that the SEAM can use to build the TDX from which to launch TDs. The SEAM module may also manage the creation, deletion, entry/exit from TDs, and the secure use of resources assigned to the TDs (such as memory or input/output (I/O) devices). Accordingly, the TDs may be secured and protected by trusting the SEAM and not the VMM (or TDRM). For example, the TDs may determine whether a portion of a program is valid and is running inside of the SEAM as opposed to running outside of the SEAM.

In one implementation, a processor deploys the SEAM module in order to enter into SEAM operation from which a TD may be launched for secure execution of a tenant workload. In implementations, the SEAM module invokes the SEAM-specific library to support the resource management for TDs and to be the trusted arbiter between the TDRM/VMM and the TDs. The processor includes a hardware register to store information that identifies a reserved range of memory. The reserved range of the memory stores the code and data of the SEAM module, including the SEAM-specific library. The processor further includes a processor core coupled to the hardware register.

The processor may execute a get secure (GETSEC) leaf function referred to as a GETSEC[ENTERACCS] instruction to bootstrap the SEAM VMX root mode software (the SEAM module) into operation via launch of an authenticated code module (ACM) referred to herein as a SEAM loader (SEAMLDR). Upon execution of the GETSEC[ENTERACCS] instruction, the processor unlocks the hardware register on the logical processor from which the ACM is launched, which unlocks the reserved range of the memory in which to load the SEAM module. An ACM is a processor-authenticated firmware module that executes out of a protected environment created in the processor core caches. In implementations, the SEAMLDR is to store the SEAM module and a manifest in the reserved range of the memory. The manifest, which may be located in the header of the SEAMLDR, may be generated via a hash algorithm run on specific information associated with the SEAM, e.g., a combination of the SEAM module, a security version number (SVN) of the SEAM, and a SEAM identifier.

In implementations, the SEAMLDR creates a SEAM virtual machine control structure (VMCS) in the reserved range of memory so that the state of the VMM may be stored in the SEAM VMCS when the logical processor transitions to the SEAM mode. The SEAM VMCS also stores a SEAM state that may be provided to load into the logical processor for execution in the SEAM. Similarly, when exiting the SEAM, the logical processor uses the data in the SEAM VMCS to restore the VMM state into the processor core. In implementations, the SEAMLDR executes in authenticated code (AC) mode and is authenticated against a manifest signature of the manifest. A key used to verify the manifest signature may be embedded in hardware of the processor core. The SEAMLDR also uses the manifest signature to authenticate the SEAM module loaded into the reserved range of the memory. The SEAMLDR may then record the measurements and identity of the SEAM module into a set of hardware measurement registers. In implementations, these measurement registers are writeable only by the SEAMLDR, thus generating a measured environment to ensure tamper-free execution. Once the SEAM has been deployed into and set up within the reserved range of the memory, the processor core may further restore a lock to the reserved range of the memory by restoring a lock to the hardware register.

Once the SEAM has been deployed via the loading process just discussed, the SEAM module has entered into SEAM VMX root mode out of which to operate TDX. The SEAM module may invoke the SEAM-specific library to execute certain privileged instructions for use in building TDX from which to launch TDs. In this way, the SEAM module may create TD virtual machines (or just "TDs" for simplicity). For each TD that is created by the SEAM module, the SEAM module may program at least two additional pieces of information within new fields of a TD VMCS that the SEAM module creates for the TD. The two additional pieces of information include a TD host key identifier (TD-HKID) and a secure extended page table (EPT) pointer (or SEC_EPTP), which is in addition to the EPT (referred to as a shared EPT herein). In implementations, outside of the SEAM, a VM entry does not consult these two pieces of information, which is specifically reserved for TDX and TD creation, so the TDRM/VMM is unaware of this additional information.

When the SEAM module performs a VM Entry, the processor uses these two additional pieces of information to enter the TD. The processor (e.g., the memory controller of the processor) may further translate, using the EPT to which the SEC_EPTP is directed, a guest physical address, of the first trust domain, to a host physical address of the memory. Additional uses of the reserved range of the memory and the SEAM module will be discussed in more detail with referenced to TDX execution. Once the SEAM module is loaded in the reserved range of the memory and operational as the SEAM, the processor may, in response to execution of a SEAMCALL instruction by the VMM (or TDRM), turn virtual root mode operational control over to the SEAM as a virtual machine exit. In other words, legacy VMX root mode may pass control to the SEAM VMX root mode. In SEAM VMX root mode, the SEAM module can manage the entry into and exit from the TD.

Through the TD VMCS, the SEAM module can request the processor to cause a VM exit of the TD on execution of certain instructions or occurrence of certain events and conditions, which will be discussed in more detail. If the event triggers an unconditional exit, the VM exit transfers control from the SEAM VMX non-root mode to the SEAM VMX root-mode. In some cases, such as in response to a system interrupt, the VM exit also triggers a SEAM exit and so control is further transferred to the legacy VMX root mode.

There are many advantages to use of the SEAM module and associated supporting hardware technologies to build and operate TDX out of the SEAM. For example, the CSP may implement the SEAM and differentiate software functionality in the SEAM, which may be built and evolve at the speed of business needs. Furthermore, the CSPs may generate open source code for review, obtain certifications, implement the SEAM in a software language of choice, and the like. Use of the SEAM may further enable new use models, such as use of secure enclaves out of a TD, use of a VMM within a TD, which would require a number of additional ISA instructions without the SEAM.

The SEAM module that is loaded in the reserved range of the memory, in addition to operating in the SEAM-VMX-root mode, may additionally use the software and hardware protection mechanisms provided by the processor for further hardening the SEAM module. These mechanisms include, for example, execute/disable (XD), virtual memory, e.g., paging, control flow of enforcement technology (CET), protection key (PK), and the like. Similarly, the TDs that are managed and invoked by the SEAM module from SEAM VMX root mode may also use these hardware protection technologies. The SEAM module ensures that the VMM/TDRM cannot hide/virtualize or in any other way prevent the use of these technologies by the TD.

Employing the SEAM further moves away from hard partitioning of platform resources in favor of flexibly sharing platform resources. Furthermore, size resources and partitioning may be based on scaling needs, e.g., maximum number of TDs, maximum size of TDs, and the like. Additionally, implementing the SEAM-based TDX as software reduces the complexity of the ISA compared to building the SEAM functionality into processor microcode, where hardware also evolves at a slower rate.

FIG. 1A is a block diagram illustrating an example computing system 100 that includes a processor 112 that supports a secure arbitration mode (SEAM) instruction set architecture (ISA) extension out of which to operate trust domain extensions (TDX). The computing system 100 may provide the software and hardware that support operation in the SEAM. The SEAM, in turn, provides functionality to support TDX operation on a virtualization server 110 supporting multiple client devices 102A, 102B, and 102C. The computing system 100 may further include a network interface 104 and shared hardware devices 160A and 160B. The virtualization server 110 may include, but not be limited to, the processor 112 and a memory device 130, e.g., memory. The processor 112 may execute a virtual machine monitor (VMM) 140, which may be extended with a TD resource manager (TDRM) 142. The VMM 140 may control one or more virtual machines (VMs) 155. The TDRM 142 may provide resource assignments to the VMs 155 and, via the SEAM, to one or more TDs 150A, 150B, and 150C.

The memory device 130 may store, among other data and information, guest page tables 132, extended page tables (EPT), VMCSs 138A associated with the one or more VMs 155 and TD VMCSs associated with the one or more TD's 150A, 150B, and 150C. The memory device 130 may further include a reserved range 136 into which a SEAM module 137 may be loaded by the SEAMLDR as discussed herein. The SEAM module 137 may include a SEAM-specific library, a manifest, and other code and data associated with the SEAM for building and operating the TDs. The one or more range registers 116 may include a SEAM range register (SEAMRR) which is configured with the reserved range 136 of the memory device 130, e.g., with a base address and a mask, or with a start address and an end address of the reserved range 136, which will be discussed in more detail with reference to FIG. 6A. The memory device 130 may include dynamic random access memory (DRAM), synchronous DRAM (SDRAM), a static memory, such as static random access memory (SRAM), a flash memory, a data storage device, or other types of memory devices. For brevity, the memory device 130 may be variably referred to as "memory" herein.

In various implementations, the processor 112 includes one or more processor cores 114, one or more range registers 116, measurement registers 117, cache 118, security version number (SVN) registers 121, a memory controller 120, write machine specific register (WRMSR) microcode 160, and memory check (MCHECK) firmware 162. The memory controller 120 may further include a MK-TME engine 126 (or other memory encryption engine) and a translation lookaside buffer (TLB) 128 that employs a TD mode bit 129 to distinguish SEAM-buffered pages from others, as will be explained.

In implementations, the MK-TME engine 126 encrypts data stored to the memory device 130 and decrypt data retrieved from the memory device 130 with appropriate encryption keys, e.g., a unique key assigned to the VM or the TD that is storing data to the memory device 130. Internally, the MK-TME engine 126 maintains an internal table used to hold keys and encryption modes (e.g., key specified, KeyID 0 (TME), and do not encrypt) which are associated with each key ID. The attributes of the table can be programmed using a processor configure (PCONFIG) instruction. In various implementations, the SEAM module 137, once operating in SEAM VMX root mode, configures TD-specific encryption keys that the MK-TME engine 126 may then employ for secure memory operations by the TDs operating out of the SEAM. Accordingly, while the MK-TME engine 126 may access the TD-specific encryption keys, once created, they are inaccessible to the TDRM 142/VMM 140 in non-SEAM operation.

In implementations, the MK-TME engine 126 may further provide integrity and reply protection. The strength of the integrity protection and whether the memory or processor state can be replay-protected may be processor-implementation dependent. Further, to support TDX, MK-TME technology may provide specific keys that can be only used for TDs. Alternately, the MK-TME technology may provide a mechanism to partition the keys such that a subset of keys may be reserved for use only by TDX technology (FIG. 8B).

Physical pages of the memory 130 may be encrypted with one of the encryption keys managed by the MK-TME engine 126. In one implementation, each encryption key is associated with a key identifier (ID), which may be added to the physical memory address of the physical page of the memory, e.g., physical memory of the host server. With the key IDs appended to the physical memory addresses, a memory transaction requested by software may fail unless the memory transaction request (e.g., of a read or write to memory) includes both the physical memory address of the page and the correct key ID for the encryption key used to encrypt/decrypt the physical page of the memory.

Each client device may be a remote desktop computer, a tablet, a smartphone, another server, a thin/lean client, and the like. Each client device may execute applications on the virtualization server 110 in one or more of the TDs 150A, 150B, and 150C and one or more of the VMs 155, where the VMs run outside the TCB of each respective TD. Other software, other than the SEAM module 137, is to also run outside the TCB of the TD. The VMM 140 may execute a virtual machine environment that is to leverage hardware capabilities of a host and execute one or more guest operating systems, which support client applications that are run from the client devices 102A, 102B, and 102C, respectively.

In implementations, a single TD, such as the TD 150A, provides a secure execution environment to a single client 102A and supports a single guest OS. In other implementations, one TD supports multiple tenants each running in a separate virtual machine and facilitated by a tenant VMM running inside the TD. The TDRM 142 may in turn control the TD's use of system resources, such as of the memory 130, the processor 112, and the shared hardware devices 160B. The TDRM 142 may act as a host and have control of the processor 112 and other platform hardware. A TDRM 142 may assign software in a TD (e.g., the TD 150A) with logical processor(s), but may not access a TD's execution state on the assigned logical processor(s). Similarly, the TDRM 142 may assign physical memory and I/O resources to a TD but not be privy to access/spoof the memory state of a TD due to separate encryption keys, and other integrity/replay controls on memory.

The TD 150A represents a software environment that may support a software stack that includes VMMs, guest operating systems, and various application software hosted by the guest OS(s). The TD 150A may operate independently of other TDs and use logical processor(s), memory, and I/O assigned by the TDRM 142 and verified by the SEAM module 137 for the SEAM. Software executing in the TD 150A may operate with reduced privileges so that the TDRM 142 may retain control of the platform resources. On the other hand, the TDRM 142 cannot access data associated with a TD or in some other way affect the confidentiality or integrity of a TD or replay data into the TD.

More specifically, the TDRM 142 (which incorporates the VMM 140) may manage the key IDs associated with the encryption keys. While the TDRM 142 may allocate key IDs, the SEAM module 137 assigns keys to the TDs and programs associated key IDs for those keys into a secure VMCS as will be discussed with reference to FIG. 6B. The key IDs that can be allocated for use by TDs are called private key IDs. Processor hardware enforces that the keys for the private key IDs are not configured by the VMM 140. In implementations, the TDRM 142 functions as a host for the TDs and has full control of the cores and other platform hardware. The TDRM 142 assigns software in a TD with logical processor(s). The TDRM 142, however, may not have access to a TD's execution state on the assigned logical processor(s). Similarly, the TDRM 142 may assign physical memory and I/O resources to the TDs, but may not be privy to access the memory state of a TD due to the use of a unique private encryption key configured by the SEAM module 137 for each TD. Software executing in the TDs operates with reduced privileges so that the TDRM 142 may retain control of platform resources. But, as the TDRM 142 allocates resources, the SEAM module 137 may ensure policies associated with TDX execution are enforced, and in this way acts as a policy enforcer.

The VMM 140 may further assign logical processors, physical memory, encryption key IDs, I/O devices, and the like to TDs, but may not access the execution state of TDs and/or data stored in physical memory assigned to TDs. For example, the MK-TME engine 126 may encrypt data and generate integrity check values before moving it from one or more range registers 116 or cache 118 to the memory 130 upon performing a "write" code. Some implementations may also include an anti-replay measure as part of generating the integrity check value. Conversely, the MK-TME engine 126 may decrypt data (and verify its integrity using the associated integrity check value) when the data is moved from the memory 130 to the processor 112 following a read or write command. Some implementations may additionally check the anti-replay measures in the integrity check value.

Figure 1B:
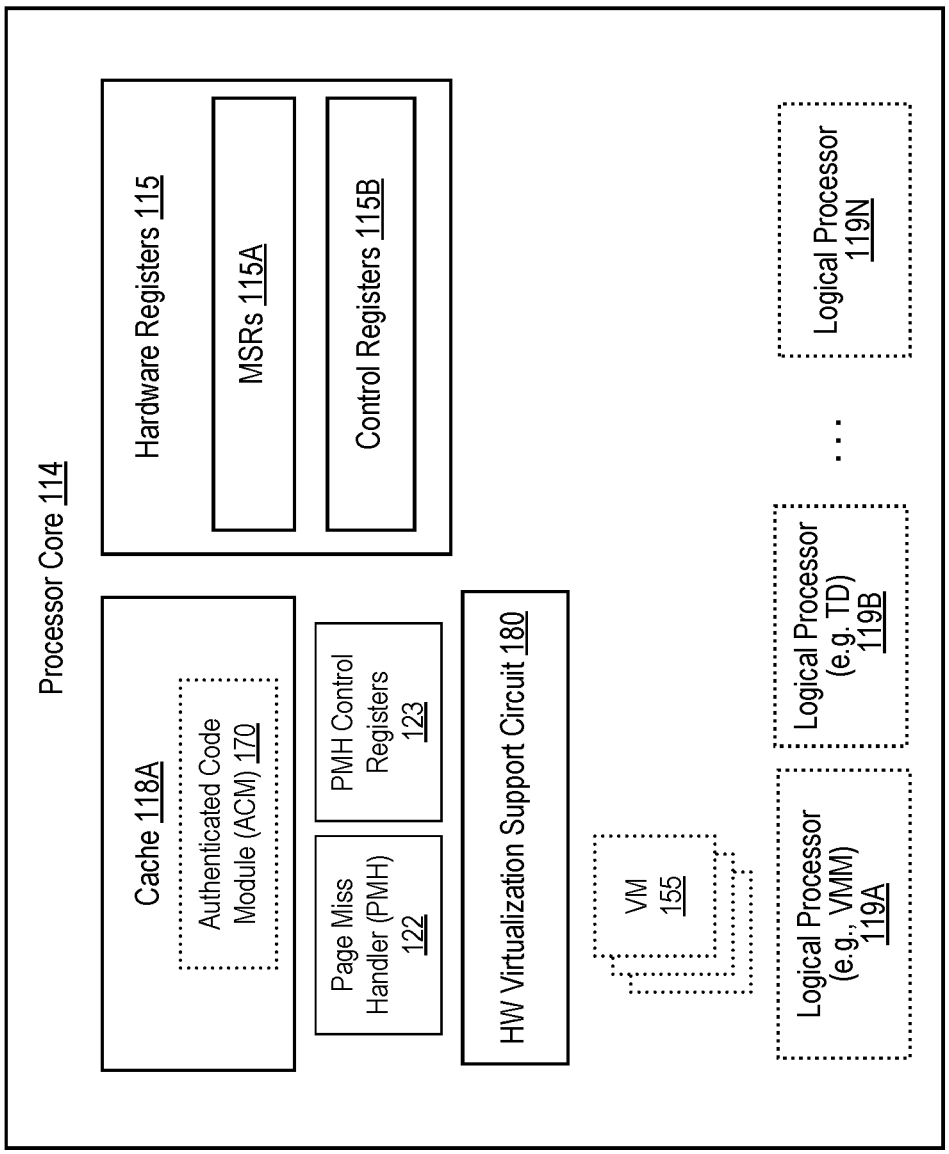
FIG. 1B is block diagram illustrating an example processor core of a processor of the computing system of FIG. 1A, according to an implementation.

FIG. 1B is block diagram illustrating an example processor core of a processor of the computing system of FIG. 1A, according to one implementation. In the implementation illustrated in FIG. 1B, each processor core 114 includes cache 118A (e.g., one or more levels of cache), a page miss handler (PMH) 122, PMH control registers 123, a hardware virtualization support circuit 180, and hardware registers 115. The hardware registers 115 may include, for example, a number of model-specific registers 115A (or MSRs) and control registers 115B (e.g., CR1, CR2, CR3, and the like). In implementations, when the cache 118 and the range registers 116 are referred to herein, that reference may be understood to additionally or alternatively include the cache 118A and the hardware registers 116 of one or more of the processor cores 114.

In various implementations, the cache 118A is loaded with an authenticated code module (ACM) 170 via execution of a GETSEC[INTERACCS] instruction. This ACM 170 may be the SEAMLDR, which may bootstrap the load of the SEAM module 137, and associated data, into the reserved range 136 of the memory device 130, e.g., of memory. In other implementations, the ACM 170, to perform the SEAMLDR functionality, is security logic of the processor core 114 such as logic embedded into hardware, is microcode or logic invoked by the SEAM module 137, or is a security microcontroller embedded in the processor 112 that employs security logic, for example. Further, or alternatively, the SEAM module 137 may invoke authenticated firmware in the security microcontroller to launch the ACM 170.

In implementations, the processor core 114 executes instructions to run a number of hardware threads, also known as logical processors, including the first logical processor 119A, a second logical processor 119B, and so forth, until an Nth logical processor 119N. In one implementation, the first logical processor 119A is the VMM 140. A number of VMs 155 may be executed and controlled by the VMM 140 as discussed previously.

In some implementations, the TDRM 142 may schedule a TD for execution on a logical processor of one of the processor cores 114. In addition to the TDX-based implementation of client virtual machines, the virtualization server 110 may execute one or more VMs 155 outside TDs for one or more client devices 102A-C. Whereas software outside trust computing base of the TDs such as the TDRM 142 and VMM 140—may not have access to physical memory pages allocated to TDs and/or execution state of TDs, the VMs operating outside TDs may not be secure against accesses by the VMM 140.

In some implementations, the MK-TME engine 126 prevents such accesses by encrypting data moving between the processor 112 and the memory 130 with one or more shared encryption keys using the MK-TME engine 126. The term "shared" is meant to refer to a key accessible to the VMM 140, and is different from private key IDs associated with keys configured by the SEAM module 137 for assignment to TDs. In implementations, the PMH 122 enforces restrictions on use of private key IDs by the VMM/TDRM or VMs in the core 114. For example, the PMH 122 may enforce that the key IDs that are private can be associated with read and write requests sent to the MK-TME 126 only when the logical processor executes in SEAM mode (root or non-root mode). If such restricted key IDs are used outside of the SEAM mode, then they cause a fault and the read or write transaction is aborted. The TD cannot specify which private key ID it gets to use as the key ID configured in the VMCS by the SEAM-module and the hardware uses the programmed TD-HKID when generating accesses to TD private memory.

The processor 112 may also restrict the PCONFIG instruction such that the private key IDs can be programmed with a key only when operating out of the SEAM module 137.

Additionally, in at least some implementations, one or more of the non-restricted keys are shared. Shared keys may be accessible by two or more entities, such as TDs and VMs running outside the TDX environment. Shared keys may be used to access one or more shared structures, such as shared hardware devices 160A and 160B, which may be a printer, a keyboard, a mouse, a monitor, a network adapter, a router, and the like. In implementations, the MK-TME 126 encrypts data stored to memory using a shared key associated with a shared key ID. The shared key ID may be used by system software including software in the SEAM as well as by devices to do direct memory access (DMA) to memory. Thus a TD can use a shared key ID to communicate with the VMM or other VMs or devices. In some cases, the TD may wish to protect the confidentiality of the data transmitted to devices, for example, the data stored on a hard drive. Since the data stored to shared memory is accessible to all software, the TD software may first encrypt such data using a specific key (e.g., a disk encryption key) before storing the data into memory using the shared key ID. In this way, when the VMM reads this data, it is decrypted by the shared key; however, what is decrypted is the content encrypted by the disk encryption key, so that the VMM cannot access the actual data. The TD may also associate integrity check values with such encrypted data such that a subsequent attempt to tamper with that data can be detected. In one implementation, a shared hardware device 160A is connected to the virtualization server 110 via a network interface 104. In another implementation, a shared hardware device is local to the virtualization server 110, as illustrated, for example by the shared hardware device 160B.

The hardware virtualization support circuit 180 may support virtualized execution of operating systems, applications, and other software by the computing device 100. The hardware virtualization support circuit 180 may include virtual machine extensions (VMX) support by providing two modes of execution: VMX-root mode and VMX non-root mode. The VMX-root mode allows executing software to have broad control of the computing device 100 and its hardware resources. Conversely, the VMM 140 or host operating system (OS) may execute in VMX-root mode. The VMX non-root mode restricts access to certain hardware instructions while still implementing the ordinary ring/privilege system of the processor core 114. One or more guest OSs (e.g., of the VMs) may execute in the VMX non-root mode. Those guest OSs may execute in ring zero, similar to being executed without virtualization. The hardware virtualization support circuit 180 may also support the EPT 134, which may be embodied as hardware-assisted second-level page address translation. The hardware virtualization support circuit 180 may be embodied as, for example, Intel® VT-x technology. In implementations, as will be discussed with reference to FIG. 4, the SEAM VMX root mode is designed to support TDX operation, which is entered using the SEAMCALL and the SEAMEXIT instructions for a given TD as will be discussed.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. The computing system 100 may be an example of a 'hub' system architecture. The computing system 100 includes the processor 112 to process data signals. The processor 112, as one illustrative example, includes a complex instruction set computer (CISC) microprocessor device, a reduced instruction set computing (RISC) microprocessor device, a very long instruction word (VLIW) microprocessor device, a processing device implementing a combination of instruction sets, or any other processing device, such as a digital signal processing device, for example. The processor 112 is coupled to a processing device bus that transmits data signals between the processor 112 and other components in the computing system 100, such as the memory device 130 and/or secondary storage 118, storing instruction, data, or any combination thereof. The other components of the computing system 100 may include a graphics accelerator, a memory controller hub, an I/O controller hub, a wireless transceiver, a Flash basic input/output system (BIOS), a network controller, an audio controller, a serial expansion port, an I/O controller, etc.

Figure 2:
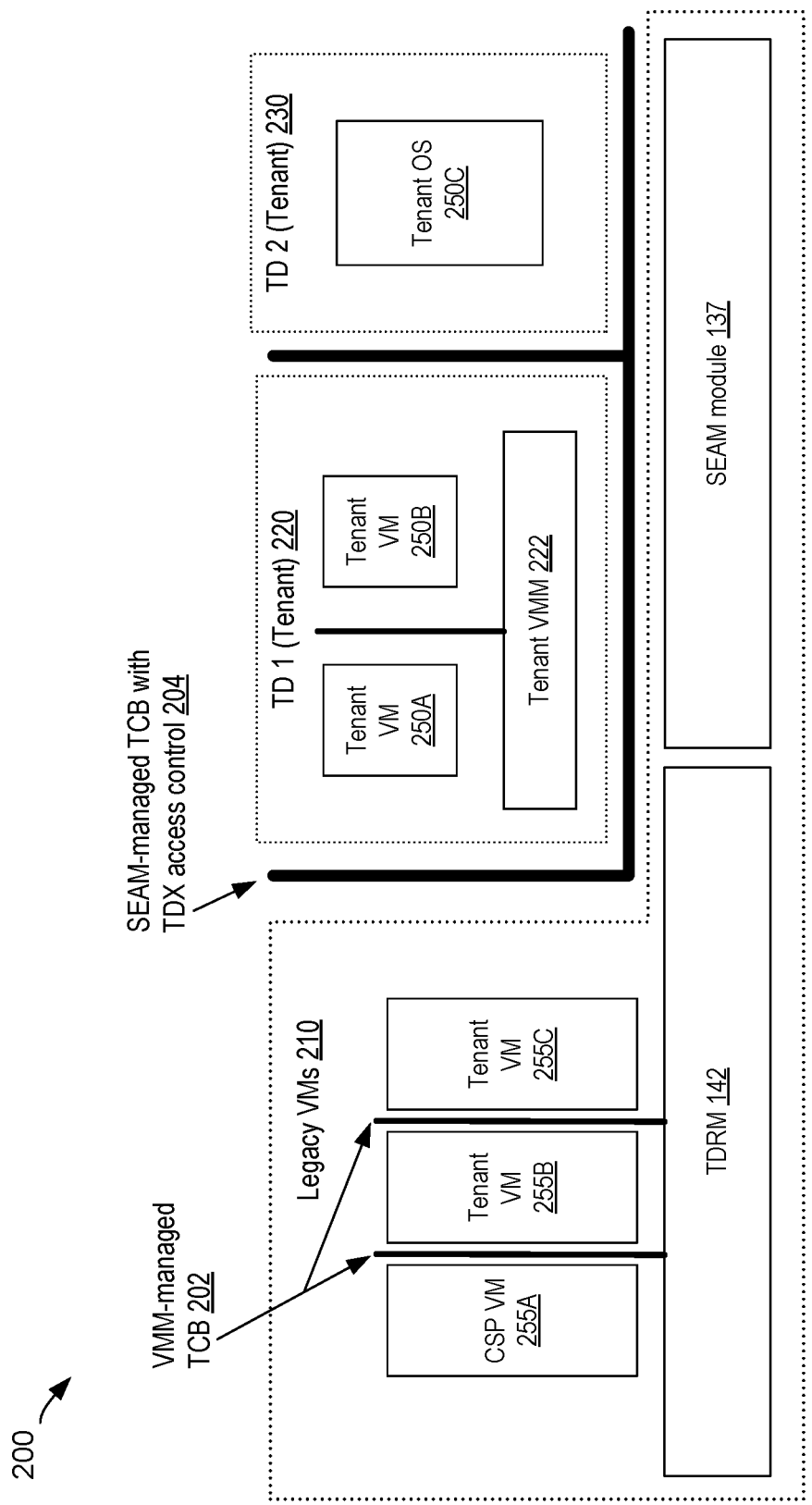
FIG. 2 is a block diagram illustrating an example computing system implementing virtual machine monitor (VMM) management of trust control boundaries with TDX access control according to implementations.

FIG. 2 is a block diagram illustrating an example computing system 200 implementing virtual machine monitor (VMM) management of trust control boundaries with TDX access control according to implementations. In implementations, the TDRM 142 (which includes the VMM 140) executing on the computing system 200 may support legacy VMs 210, e.g., a CSP VM 255A, a first tenant VM 255B, and a second tenant VM 255C. These legacy VMs may still leverage memory encryption via TME or MK-TME in this model.

The TDRM 142, as verified and enforced by the SEAM module 137, may further support two types TDs, a TD1 220 and a TD2 230, both of which may be implemented where the TD is a tenant that does not trust the CSP (e.g., the virtualization server 110) to enforce confidentiality. Accordingly, the TD1 and TD2 rely on execution of the SEAM out of the reserved range 136 of the memory to implement TDX, which provides the confidentiality and protection of the TDs. The TD1 220 is shown with a virtualization mode (such as VMX) being utilized by the tenant VMM (non-root) 222 running in TD1 220 to manage tenant VMs 250A, 250B. The TD2 230 does not include software using a virtualization mode, but instead runs an enlightened OS 250C in the TD3 230 directly. TD1 220 and TD2 230 are tenant TDs having a SEAM-managed TCB with TDX access control 204 as described in implementations of the disclosure. In one implementation, TD1 220 or TD2 230 may be the same as any of the TDs 150A, 150B, or 150C described with respect to FIG. 1A.

The TDRM 142 and the SEAM modules 137 manage the life cycle of the VMs and TDs including allocation of resources. However, the TDRM 142 is not in the TCB for TD types TD1 220 and TD1 230. The processor 112 does not place any architectural restrictions on the number or mix of TDs active on a system. However, software and certain hardware limitations in a specific implementation may limit the number of TDs running concurrently on a system due to other constraints.

Figure 3:
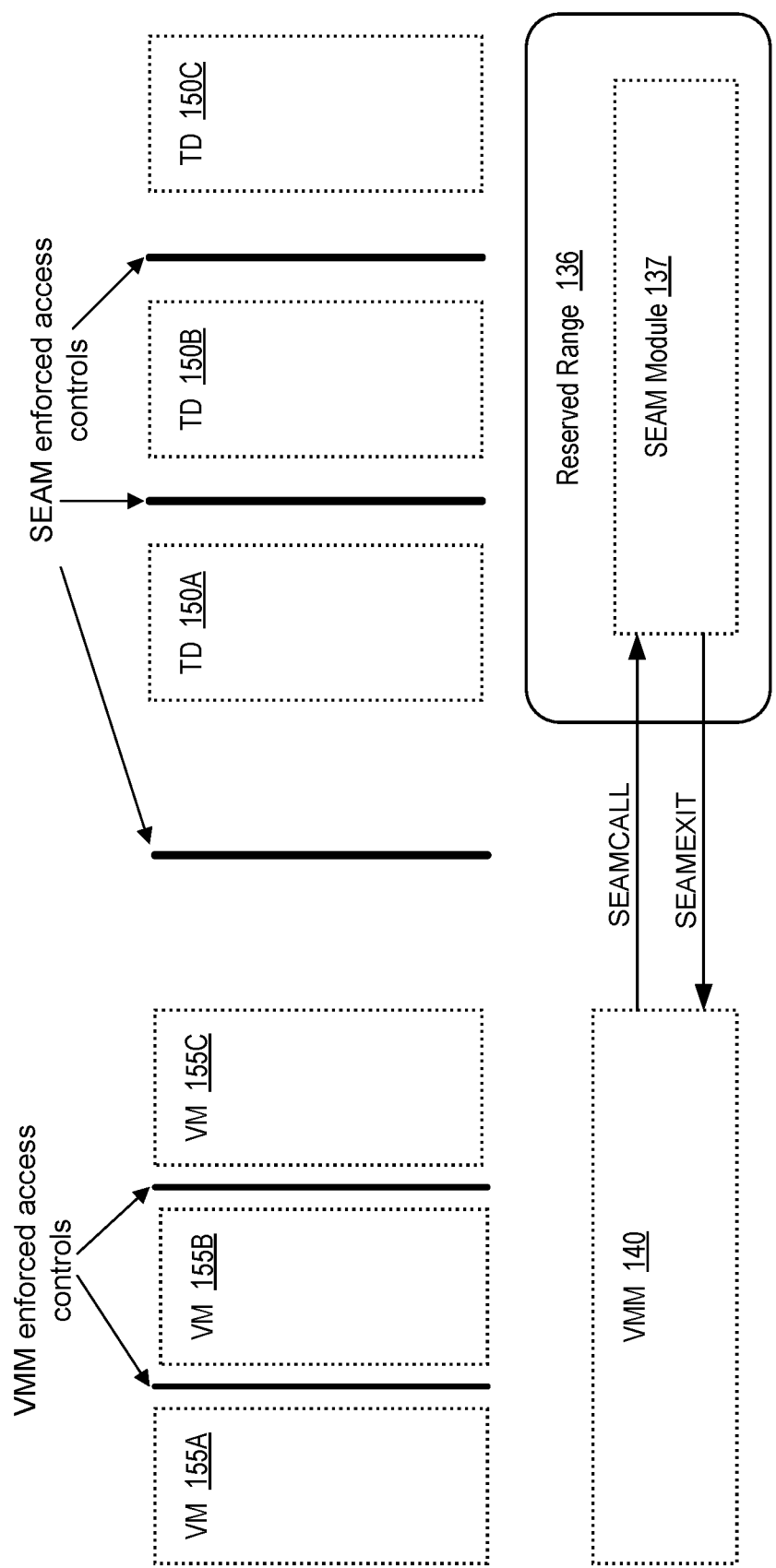
FIG. 3 is a block diagram illustrating components of the TDX implemented by a processor supported with a SEAM module, according to one implementation.

FIG. 3 is a block diagram illustrating components of the TDX implemented by a processor supported with the SEAM module 137, according to one implementation. In this implementation, the VMM 140 enforces access controls between the VMs 155A, 155B, and 155C. To enter the secure arbitration mode (SEAM) that is to implement TDX, the SEAM module 137 may be stored in (e.g., loaded into) the reserved range 136 of the memory in addition to other supporting data and information, which will be discussed in detail. Before loading the SEAM module 137 into the reserved range 136 of the memory, the processor may setup memory encryption for the reserved range using a platform-reserve encryption key for encrypting the SEAM-reserved memory range. The memory controller 120 may encrypt the SEAM module, using the platform-reserved encryption key, before the SEAM module 137 is stored into the reserved range 136 of the memory. The memory controller 120 may further encrypt and integrity protect, using the platform-reserved encryption key, data stored in and retrieved from the reserved range 136 of the memory, e.g., other data associated with the SEAM such as page tables, a VMCS per logical processor, and like as will be further discussed with reference to FIGS. 6A-6B.

In implementations, the SEAM module 137 facilitates the implementation of TDX to launch and control access to the one or more TDs 150A, 150B, and 150C. The SEAM module 137 may instantiate as many TDs for which the TDRM and the SEAM module have resources to support. The VMM 140 may invoke the SEAMCALL instruction to request to enter the SEAM. The SEAM module 137 may later invoke the SEAMEXIT instruction to exit the SEAM and turn root mode operational control back over to the VMM 140. The particulars of the SEAMCALL and the SEAMEXIT instructions will be discussed in more detail with reference to FIGS. 4, 9A-9B, and 19-20.

Figure 4:
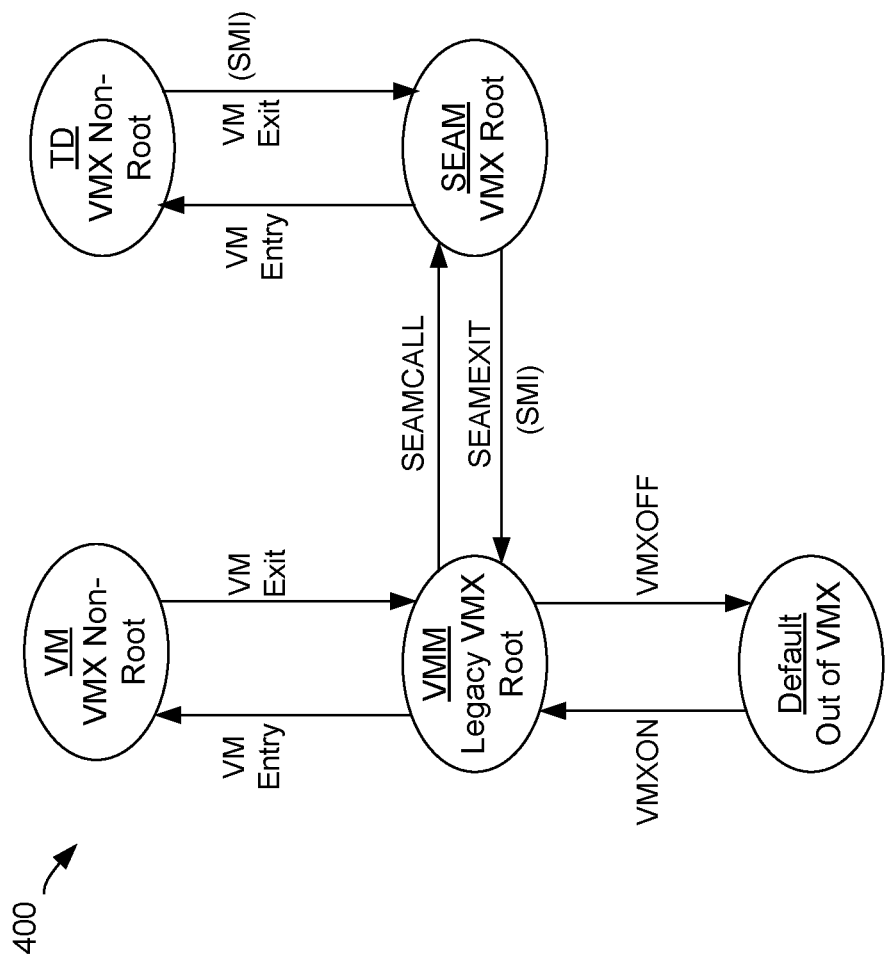
FIG. 4 is a flow diagram illustrating virtual machine extensions (VMX) and SEAM-based TDX transitions, according to implementations.

FIG. 4 is a flow diagram illustrating virtual machine extensions (VMX) and SEAM-based TDX transitions 400, according to implementations. As discussed, the SEAM is an extension to virtual machines extension architecture to define a new VMX root mode called SEAM VMX root mode, to distinguish it from legacy VMX root mode. This SEAM VMX-root mode is used to host a processor-attested module (e.g., the SEAM module 137) to create virtual machine (VM) guests called TDs. More particularly, VMs launched or resumed from SEAM VMX-root mode are TDs and VMs launched or resumed from legacy VMX-root mode are legacy VMs. The launching or resuming of a VM or a TD is performed with a VM entry and exiting out of the VM or TD is performed with a VM exit. One of the reasons to exit out of the TD to the SEAM VMX root mode may be in response to detecting a system management interrupt (SMI). The partitions (see FIG. 3) between the TDs may be implemented by the SEAM using VMX hardware extensions like EPT and the like.

In implementations, the TD runs in the processor SEAM VMX non-root mode to protect the confidentiality of memory contents and processor state of the TD from other software (other than the SEAM module 137 executing out of the reserved range 136 of the memory), including the hosting VMM, unless explicitly shared by the TD itself. The software executing in SEAM VMX-root mode provides arbitration of resources between the TD and the VMM/TDRM. In many implementations, the code size of the software in SEAM VMX root mode (SEAM library) is substantially smaller than the code size of the untrusted VMM.

In one implementation, and with continued reference to FIG. 1A, the SEAM module 137 executes out of the reserved range 136 of memory specified using one of the range registers 116, e.g., a SEAM range register (SEAMRR) that is configured by the CSP. The reserved range 136 may be programmed by the BIOS (not illustrated in FIG. 1A) and verified by the MCHECK firmware 162. Since the BIOS is not trusted to configure the SEAMRR correctly, in implementations, the processor 112 provides a processor-authenticated firmware module called MCHECK. In implementations, the BIOS is to invoke the MCHECK firmware 162 to activate the SEAMRR range that it configured into the SEAMRR range registers. The processor executes the MCHECK firmware 162 out of a protected environment created in the caches 118A of the processor core(s) 114 such that the MCHECK execution cannot be tampered with by untrusted software and other devices in the platform. Extending MCHECK functionality to cover this validation ensures the range register 116 has been programmed identically on the processor cores 114 and that values for the reserved range 136 of the memory stored in the range register 116 has not been configured to overlap with specific memories reserved for devices or other special memories like Trusted Execution Technology (TXT) memory ranges (since such special memory ranges are not protected by the MK-TME). The MCHECK firmware 162 may further configure a platform-reserved encryption key of the MK-TME engine 126 used to encrypt, and to integrity and replay protect, data stored to the reserved range of the memory.

The SEAM module 137 may be software stored to the reserved range 136 programmed with the range register 116. In one implementation, the authenticated code module (ACM) 170 (FIG. 1B), or other security logic, is executed in order to load the SEAM module 137 into the reserved range 136 of the memory. Accordingly, the ACM 170 may function and be referred to as a SEAM loader ACM (or "SEAMLDR"). The ACM are processor-authenticated firmware modules that execute out of a protected environment created in the caches 118A of the processor core(s) 114. The ACM technology was introduced as part of Intel® Trusted Execution Technology (TXT). The SEAMLDR is a new type of ACM which is launched using the GETSEC[ENTERACCS] instruction. The MCHECK firmware 162 may tell hardware that the reserved range 136 of memory is verified and can be used by the ACM 170 and the SEAM module 137. In one implementation, the ACM 170 copies the SEAM module 137 and a manifest into the reserved range 136 of the memory. The ACM 170 may then verify the manifest (e.g., a message digest of the SEAM module and loadable components, a security version number (SVN), and other such information) associated with the SEAM module. Functioning of the ACM 170 will be discussed in more detail with reference to FIG. 5.

In various implementations, the processor transitions from legacy VMX-root mode to SEAM VMX-root mode in response to the SEAMCALL instruction invoked by the untrusted VMM (or TDRM). This transition is similar to a parallel VM exit to perform peer monitoring in response to a VMCALL from the VMM. The processor transitions out of SEAM VMX root mode to legacy VMX root mode in response to the SEAMEXIT instruction. This transition is similar to a parallel VM entry from peer monitor to legacy VMX root mode in response to a VMRESUME from the peer monitor. Peer monitor is also called SMM transfer monitor (STM) and is part of the Intel® VTx.

With additional reference to FIG. 4, keeping the execution within the legacy VMX root mode separate from execution within the SEAM VMX root mode ensures that sensitive data and measurements generated in SEAM operation is not visible or accessible to the VMM or other legacy VM's. The system management mode (SMM) of the processor 112 may allow selection, e.g., opt in and opt out options to VMX architecture, and has access to hardware registers of the processor 112.

In one implementation, assume that a first logical processor is operating within the SEAM VMX non-root mode in a first TD. Assume the first TD detects a system management interrupt (SMI). In this situation, the first TD may perform a VM exit to the SEAM VMX root mode. The SEAM VMX root mode may then securely store secrets and confidential data of the first TD from hardware registers of the processor 112 back to the memory device 130, e.g., in encrypted form using a host key ID (HKID). The actual encryption and storing to memory may be performed by the MK-TME 126. The SEAM module 137 may then clear out the secrets thus saved from processor register states such that no TD state leaks out. The VMX root mode may then execute the SEAMEXIT instruction to exit out of the SEAM VMX root mode and transfer virtual root operational control (e.g., VMX root mode control) of the logical processor back over to the legacy VMX root mode, e.g., in the VMM 155.

In implementations, the SMI is masked when in SEAM VMX root mode such that even though the pendency of the SMI pending in the SEAM VMX non-root mode causes the VM exit, the SMI itself remains pending because it is masked in SEAM VMX root mode. Once in legacy VMX root mode, the SMI can actually be handled and causes a transition to the system management mode (SMM) or causes a SMI VM-exit to the SMM. Once in SMM, the SMM can read the register contents of the processor. The SMM, however, cannot see any TD or SEAM module secrets since such secrets have been removed by the SEAM module before performing the SEAMEXIT to the legacy VMX root mode. Thus the SMM sees the state of the processor as exists in the legacy VMX root mode With continued reference to FIGS. 1A and 4, the reserved range 236 of the memory device 130 for the SEAM library may be allocated by BIOS and programmed into the range register 116 (e.g., SEAMRR) using MSRs. Accesses to the reserved range 136 of the memory when not in the SEAM may trigger an abort page redirection. When in SEAM VMX root mode, the reserved range 136 provides memory type to the access as a write back (WB) if register CR0.CD=0 and as uncacheable (UC) if register CR0.CD=1. Since the memory type of the SEAM reserved range cannot be tampered by the VMM, the memory type may protect the SEAM module 137 from attacks by the VMM through configuring unexpected memory types for this range like configuring this range to be write-combining.

In implementations, the WRMSR microcode 160 enforces that the reserved range 136 of the memory is configured as a contiguous range and is not programmed to overlap with memory ranges reserved for specific uses or special devices, e.g., system management range register (SMRR), SMRR2, processor reserved memory range registers (PRMRR) or IA32_APIC_BASE. Attempting to write to the reserve range base address or mask is to cause such an overlap causes a general protection fault (#GP(0) fault). Similarly, attempting to program the PRMRR, SMRR, SMRR2, or IA32_APIC_BASE to overlap with the reserved range 136 region is to cause a general protection fault. Protected ranges are defined by the base address plus a mask added to the base address. The reserved range 136 of the memory may also be specified by a start address and an end address.

In implementations, the BIOS allocates the base address and the mask defining the reserved range 136 of the memory and sets the lock bit on the range register 116, associated with this reserved range 136 of the memory, of each processor core 114. An uncore copy may be maintained for the range register 116 and is updated by the WRMSR microcode 160.

In various implementations, the MCHECK firmware 162 is a trusted module that is embedded in a microcode patch and is launched by a microcode patch load to validate processor-protected range registers and their configuration. This module is currently used to validate security guard extensions (SGX) memory configuration. The MCHECK firmware 162 may be extended to validate the SEAM range registers 116. The MCHECK firmware validates the configuration of the reserved range 136 stored with the SEAM range register 116 (e.g., SEAMRR) similarly as it does with the PRMRR (enforces identical rules about configuration like overlaps with memory-mapped I/O (MMIO) and the like. The MCHECK firmware 162 may further require that the MK-TME engine 126 on the platform is configured with integrity enabled as a pre-requisite to marking the SEAMRR as valid. The MCHECK firmware may make PRMRR being valid as a precondition to marking SEAMRR as valid.

In implementations, the physical memory range programmed into the SEAM range register 116 (e.g., SEAMRR) is to have a key ID of zero ("0"), which may be enforced by the MCHECK firmware 162. The ephemeral key used for SEAMRR accesses is not the same as the key addressed by key ID zero by the VMM for legacy VMs. Instead, accesses to the reserved range 136 of the memory are encrypted and integrity protected using a platform-reserved encryption key that is also used for encryption and integrity protection of the reserved range stored in the PRMRR. This platform-reserved encryption key may be programmed into the MK-TME engine 126 by the MCHECK firmware 126. This platform key may be randomly regenerated on every boot. So, even if an attacker were to capture encrypted memory of the computing system 100, the attacker would not be able to inject into range on a subsequent power up.

Figure 5:
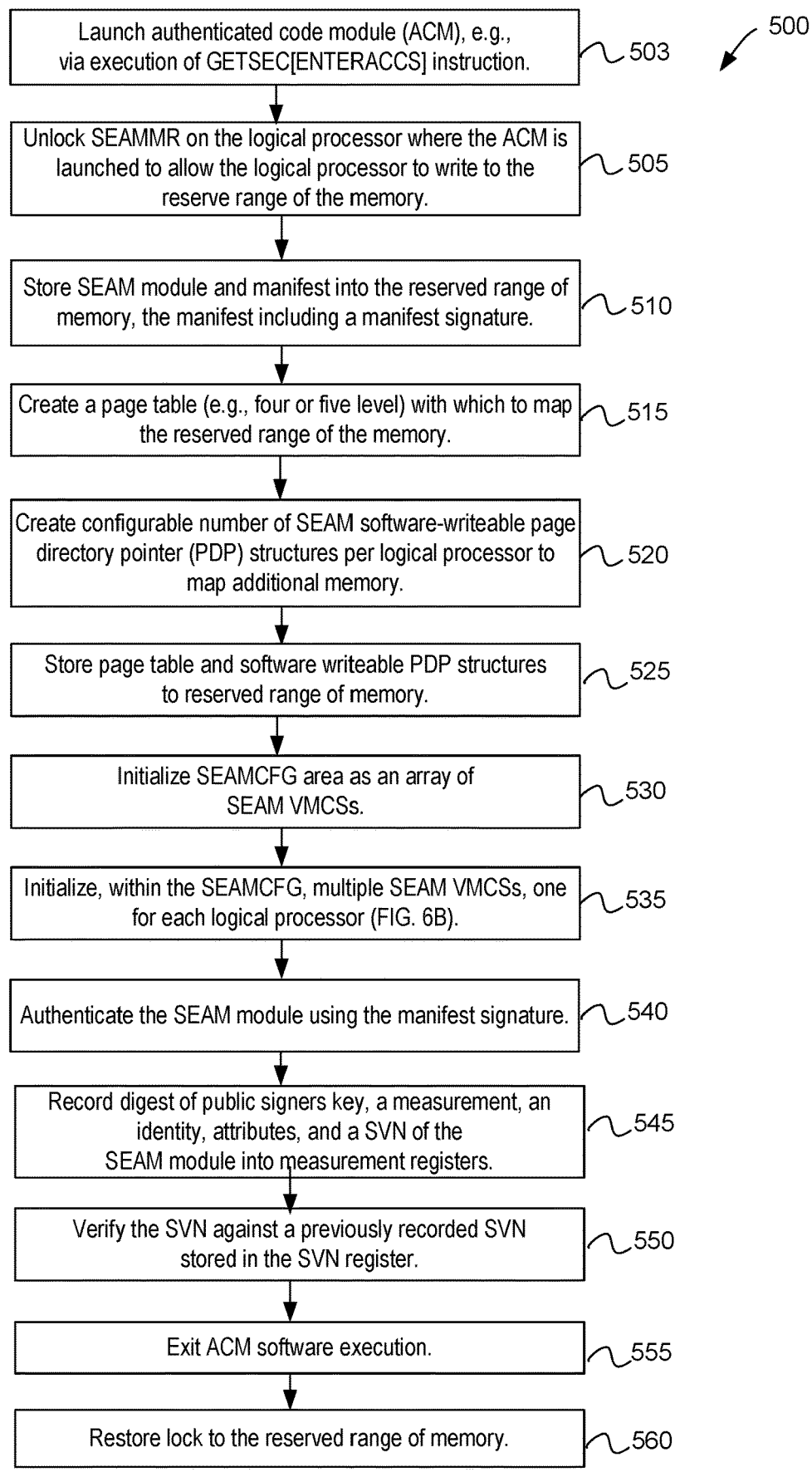
FIG. 5 is a flow diagram of a method of deploying a SEAM module and manifest associated with the SEAM module to enter into the SEAM, according to an implementation.

FIG. 5 is a flow diagram of a method 500 of deploying the SEAM module and manifest associated with the SEAM module to enter into the SEAM, according to an implementation. Method 500 may be performed by processing logic that may include hardware (e.g., circuitry, dedicated logic, programmable logic, microcode, etc.), software, firmware or a combination thereof. In one implementation, method 500 is performed by the processor 112 of FIG. 1A. In another implementation, the method 500 is performed by any of the processing devices described with respect to FIG. 11A through FIG. 21. Alternatively, other components of the computing system 100 (or software executing on the processor 112) may perform some or all of the operations of the method 500.

With reference to FIG. 5, the method 500 may start with the processing logic launching the ACM 170 via execution of a get secure leaf function called the GETSEC[ENTERACCS] instruction (503). In particular, the ACM 170 (SEAMLDR) of the processor 112 may perform the method 500, e.g., to bootstrap the SEAM VMX root mode software. The ACM 170 may be launched using the GETSEC[ENTERACCS] instruction. The method 500 may continue with the processing logic unlocking the range register 116 (SEAMRR) on the logical processor where the ACM is launched to enable that logical processor to write to the reserved range 136 of the memory (505). Further, the GETSEC[ENTERACCS] instruction may cause the processor 112 to set up the cache 118A of the processor core 114 (FIG. 1B) in a particular mode, so instead of acting like cache, the cache 118A acts like RAM, e.g., authenticated code RAM. Because set up in the cache, this authenticated code RAM cannot be snooped by a non-core agent. The processor core 114 may then copy the ACM 170 into this RAM set up within the cache 118A. Once the ACM 170 is executing in this way, the method 500 may proceed. Other implementations of the ACM 170 are envisioned as previously discussed.

With continued reference to FIG. 5, the method 500 may continue with the processing logic storing the SEAM module 137 and a manifest into the reserved range 136 of the memory, where the manifest includes a manifest signature (510). This memory copy of the SEAM module 137 may initialize the memory integrity for the SEAM loadable assets copied using the platform encryption key reserved for the SEAM during MCHECK. The method 500 may continue with the processing logic creating a page table (e.g., four or five-level page table) with which to map the reserved range of the memory (515). This creation of the page table may further include creation of a page table pointer that points to the page table. The method 500 may continue with the processing logic creating a configurable number of SEAM software-writeable page directory pointer (PDP) structures with which the first logical processor is to map additional memory in which to store data of the first trust domain (520). The method 500 may continue with the processing logic storing, within the reserved range 136 of the memory, the page table and the software-writable PDP structures (525).

With continued reference to FIG. 5, the method 500 may continue with the processing logic initializing, with a data array for SEAM controlling VMCSs, a configuration area within the reserved range 136 of the memory (530). The configuration area may be called SEAM configuration (SEAMCFG). The method 500 may continue with the processing logic initializing, within the data array, multiple SEAM VMCSs, each of which is assigned to a different logical processor of the processor core 114 (535). The initialization of each SEAM VMCS may include initialization of various fields of the SEAM VMCS, including, but not limited to, entry controls, exit controls, address of from where to execute the SEAM module on execution of the SEAMCALL instruction, stack pointers, the page table pointer, and other state values of the SEAM module to establish on execution of the SEAMCALL instruction. In this way, each SEAM VMCS may be used to establish a SEAM state for use during a subsequent execution of the SEAMCALL instruction. More particularly, the SEAM module 137 is able to store the VMM state and the SEAM state into the SEAM VMCS to facilitate transitions back and forth between the VMM and the SEAM module. These transitions are discussed in more detail with reference to FIGS. 4 and 9A-9B.

The method 500 may continue with the processing logic (e.g., the SEAMLDR) authenticating the SEAM module 137 using the manifest signature (540). In various implementations, the manifest includes at least two of the following: (i) a manifest signers public key; (ii) a first digest of the manifest signers public key; (iii) a second digest of the SEAM module and associated loadable components; (iv) a security virtual number (SVN) of the SEAM module; and (v) attributes of the SEAM module, such as whether the SEAM module 137 is a debug module or a production module. The manifest is signed (to generate the manifest signature) using the manifest signers private key, which may be a secret key kept in secure signing facility hardware of the processor 112. To authenticate the manifest signature, the processing logic may verify the manifest signature using the manifest signers public key as recorded in the manifest. If the signature does not verify, then verification fails. The processing logic may further generate a digest of the SEAM module and loadable components and compare this digest against the digest recorded in the manifest. If this digest does not match, then authentication fails.

The method 500 may continue with the processing logic recording a digest of the manifest signers public key, a measurement, an identity, the attributes, and the SVN of the SEAM module 137 into the measurement registers 117 (545). In implementations, the measurement registers 117 are model specific registers (MSRs), which may be located in internal microcode only memory or other internal secure memory.

In various implementations, the identity and the measurement of the SEAM module is each created using a cryptographic hash algorithm on particular data to create a particular digest. More particularly, the identity of the SEAM module may be the first digest of the manifest signers public key. Further, the measurement of the SEAM may be determined by generating a third digest of a combination of: (i) the SEAM module and associated loadable components; and (ii) the manifest signature. Other subcomponents are envisioned, but this measurement provides a complete and detailed measurement of the SEAM module, which includes various attributes and the SVN of the SEAM module. It is this third digest that maybe recorded in the measurement registers as the measurement of the SEAM module 137.

With continued reference to FIG. 5, the method 500 may continue with the processing logic (e.g., the SEAMLDR)

verifying the SVN of the manifest signature against a previously recorded SVN value stored in the SVN register 121 (550). In this way, the SEAMLDR may enforce that the SVN associated with the SEAM module 137 is a certain minimum. The SVN is incremented when security issues are fixed in the SEAM module, e.g., via an upgrade to the SEAM module. The SEAMLDR can, in this way, verify the SVN to ensure that an older (buggy) SEAM module is not loaded instead of the upgraded SEAM module.

The method 500 may continue with the processing logic exiting execution of the ACM 170 software (555). The method 500 may continue with the processing logic restoring the lock to the reserved range 136 of the memory (560). For example, execution of a GETSEC[EXITAC] may restore the lock and valid bit state to the range register 116 (SEAMRR), to reassert a lock on the reserved range 136 of the memory. In another embodiment the processor may allow the SEAMLDR ACM to explicitly lock and unlock the SEAM range register using the WRMSR microcode 160.

Figure 6A:
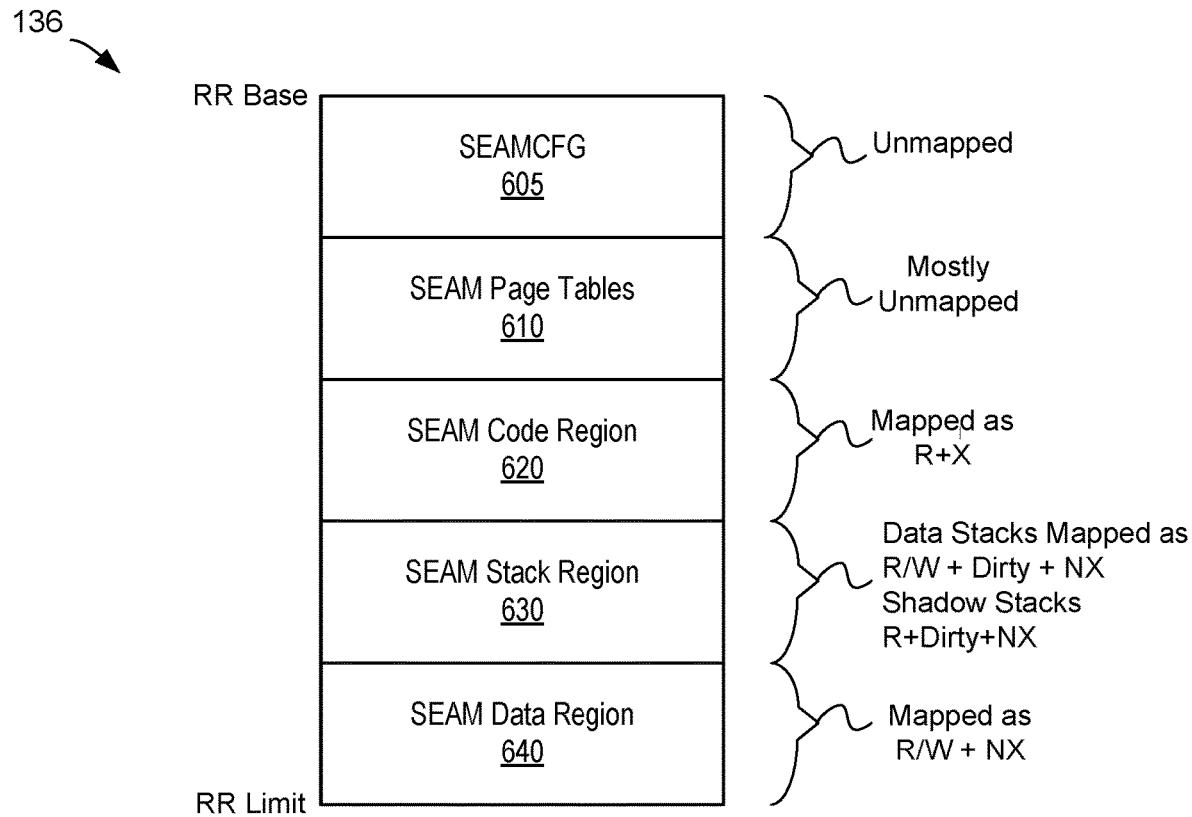
FIG. 6A is a block diagram illustrating a reserved range of the memory after successful completion of loading the SEAM module and related data by an authenticated code module, according to an implementation.

FIG. 6A is a block diagram illustrating the reserved range 136 of the memory after successful completion of loading the SEAM module 137 and related data by the authenticated code module (ACM) 170, according to an implementation. According to implementations, the reserved range 136 includes a SEAM configuration portion (SEAMCFG) 605 (see FIG. 6B), page tables 610, a code region 620, a stack region 630, and a data region 640. The page tables 610 may be used in mapping virtual memory and may be set up by the SEAMLDR. The SEAM module 137 may subsequently use some of the virtual address ranges in this page table to map additional memory outside the SEAM range, for example, the memory of a TD guest. The stack region 630 may include two types of stacks, including: (1) a data stack that holds return addresses and data; and (2) a shadow stack that holds only return addresses, e.g., an instruction stack. The shadow stack may check to see if any corruption has happened to the return address on the data stack and prevent returns to addresses that are corrupted. Use of these two types of stacks may facilitate the use of control flow information enforcement technology by the SEAM module 137.

In various implementations, the SEAMCFG 605 is unmapped while the page tables 610 are mostly unmapped and the code region 620 is mapped as read (R) and execute (X). The stack region 630 may include data stacks mapped as read/write (R/W), plus dirty, and not executable (NX). The stack region 630 may further include shadow stacks as read (R), dirty, and not executable (NX). The data region 640 may be mapped as read/write (R/W) and not executable (NX). Other mappings are envisioned.

Figure 6B:
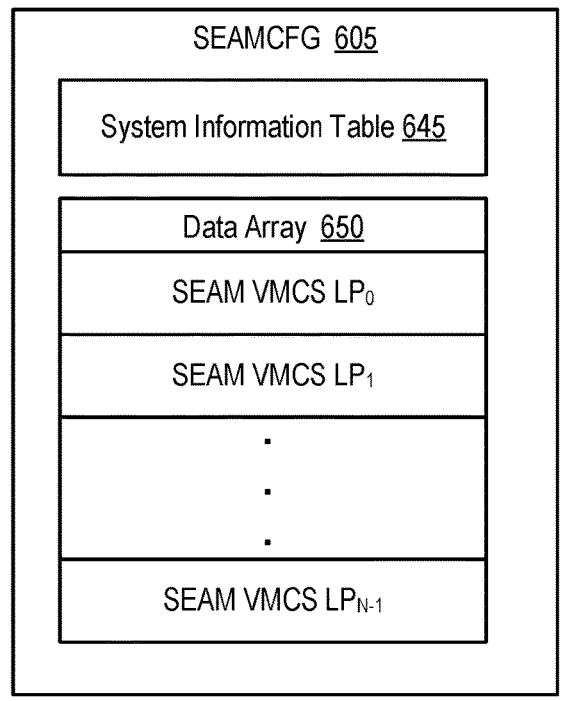
FIG. 6B is a block diagram of a SEAM configuration portion of the reserved range of the memory to store, in part, virtual machine control structures (VMCSs), one per logical processor, according to an implementation.

FIG. 6B is a block diagram of the SEAM configuration portion (SEAMCFG) 605 of the reserved range 136 of the memory to store, in part, virtual machine control structures (VMCSs), one per logical processor, according to an implementation. The SEAMCFG portion 605 may include a system information table 645 and a data array 650 in which to store a SEAM VMCS, which is a controlling VMCS to control transition into the SEAM, per logical processor of the processor core 114, which are indicated as $LP_0$, $LP_1$ to $LP_{N-1}$ in FIG. 6B. Each logical processor of the processor core 114, for example, may support a different set of workloads for a different tenant. The SEAM may therefore be entered on multiple logical processors simultaneously. The system information table 645 may be populated by the MCHECK firmware 162 and the ACM 170, e.g., the SEAMLDR. The system information table 645 may store information such as the number of sockets in the platform of the virtualization server 110, the number of DRAM (or other memory) regions that can be used to host TD private pages, and may define additional table entries as transition into TDX operation progresses.

In implementations, the SEAMLDR may configure the data array 650 with the multiple SEAM VMCSs. In various implementations, the SEAMLDR may use the system information table 645 to pass certain information onto the SEAM module 137, such as how much memory is available for mapping virtual pages. Furthermore, following execution of the SEAMCALL instruction by a first logical processor (e.g., $LP_0$) for purposes of explanation, the SEAMLDR sets up a first SEAM VMCS for the first logical processor in the data array 650 by, in part, configuring the first SEAM VMCS with information like the instruction pointer address from where to start executing instructions upon entry into the SEAM mode, the data stack pointer and shadow stack pointer, and the like. Furthermore, the VMM state of the first logical processor is saved into the first SEAM VMCS in preparation to exit legacy VMX root mode. In further implementations, the SEAM VMCS of the first logical processor is located at an index of the initial x2 advanced programmable interrupt controller (APIC) ID (not software modifiable) of the first logical processor.

Figure 7A:
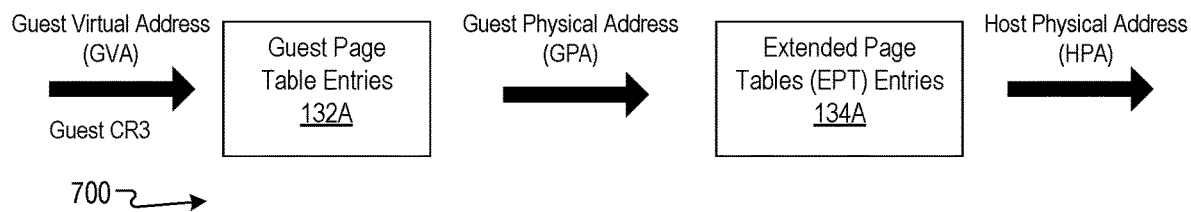
FIG. 7A is a block diagram illustrating translation of a guest virtual address to a guest physical address and of a guest physical address to a host physical address, according to an implementation.

FIG. 7A is a block diagram 700 illustrating translation of a guest virtual address (GVA) to a guest physical address (GPA) and of the GPA to a host physical address (HPA) or a physical memory address, according to an implementation. In one implementation, in order to emulate an instruction on behalf of a VM, the VMM 140 may need to translate a linear address (e.g., a GVA) used by the instruction to a physical memory address such that the VMM can access data at that physical address. As discussed, the VMM may also gain access to an appended key ID without the safeguards put in place as discussed within this disclosure.

In order to perform that translation, the VMM may need to first determine paging and segmentation including examining a segmentation state of the virtual machine (VM) 155. The VMM may also determine a paging mode of the VM 155 at the time of instruction invocation, including examining page tables set up by the VM and examining the control registers 134 and MSRs programmed by the VM 155. Following discovery of paging and segmentation modes, the VMM may generate a GVA for a logical address, and detect any segmentation faults.

Assuming no segmentation faults are detected, the VMM may translate the GVA to a GPA and the GPA to an HPA, including performing a page table walk in software. To perform these translations in software, the VMM may load a number of paging structure entries and EPT structure entries originally set up by the VM 155 into general purpose registers or memory. Once these paging and EPT structure entries are loaded, the PMH 122 may perform the translations by modeling translation circuitry as follows.

More specifically, with reference to FIG. 7A, the PMH 122 may be programmed with a guest page table pointer and an EPT pointer from the VMCS when the VMM performs a VMRESUME that uses that VMCS. The PMH 122 may load a plurality of guest page table entries 132A from the guest page tables 132 and a plurality of extended page table entries 134A from the EPT 134 that were established by the VM. The PMH 122 may then perform translation by walking (e.g., sequentially searching) through the guest page table entries 132A to generate a GPA from the GVA. The PMH may then use the GPA to walk (e.g., sequentially search) the EPT 134 to generate the HPA associated with the GPA. Use of the EPT 134 is a feature that can be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access physical memory.

Figure 7B:
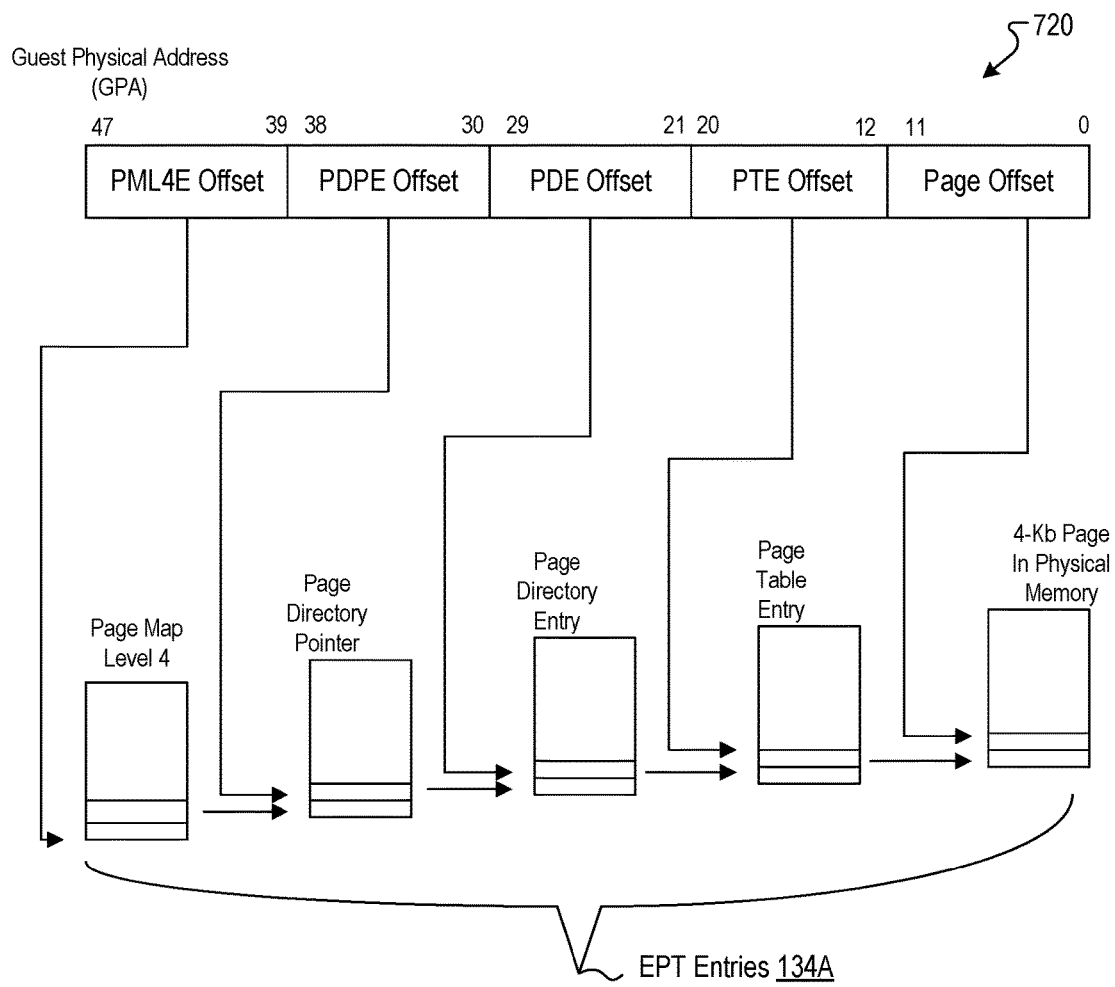
FIG. 7B is a block diagram illustrating use of extended page tables (EPT) to translate the guest physical address to the host physical address, according to an implementation.

FIG. 7B is a block diagram 750 illustrating use of extended page tables (EPT) to translate the guest physical address (GPA) to the host physical address (HPA), according to an implementation. For example, the VMM 140 or the PMH 122 may walk the extended page table entries 134A to translate a GPA to an HPA, according to one implementation. For example, the guest physical address (GPA) may be broken into a series of offsets, each to index within a table structure of a hierarchy of the EPT entries 134A. In this example, the EPT from which the EPT entries are derived includes a four-level hierarchal table of entries, including a page map level 4 table, a page directory pointer table, a page directory entry table, and a page table entry table. (In other embodiments, a different number of levels of hierarchy may exist within the EPT, and therefore, the disclosed embodiments are not to be limited by a particular implementation of the EPT.) A result of each index at a level of the EPT hierarchy may be added to the offset for the next table to locate a next result of the next level table in the EPT hierarchy. The result of the fourth (page table entry) table may be combined with a page offset to locate a 4 Kb page (for example) in physical memory, which is the host physical address.

Figure 8A:
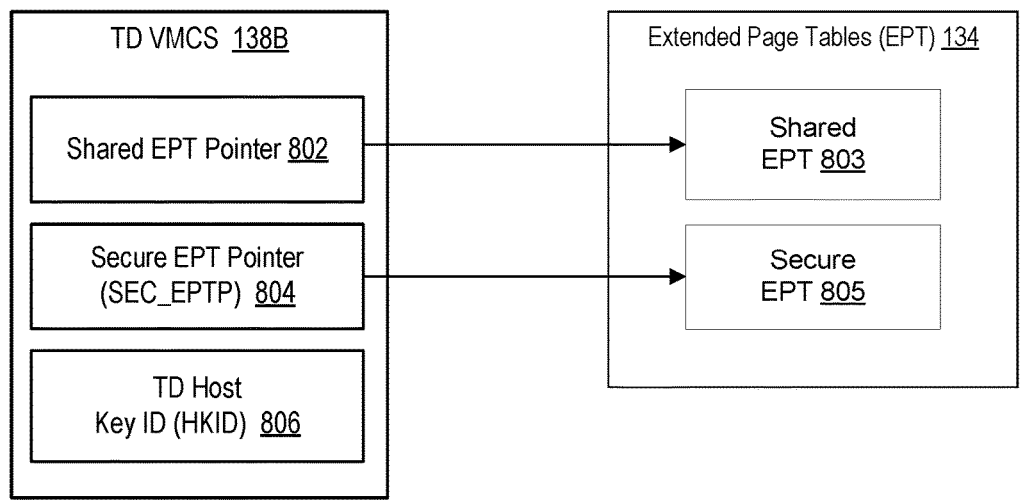
FIG. 8A is a block diagram of a trust domain (TD) VMCS set up by the SEAM module according to one implementation.
Figure 8B:
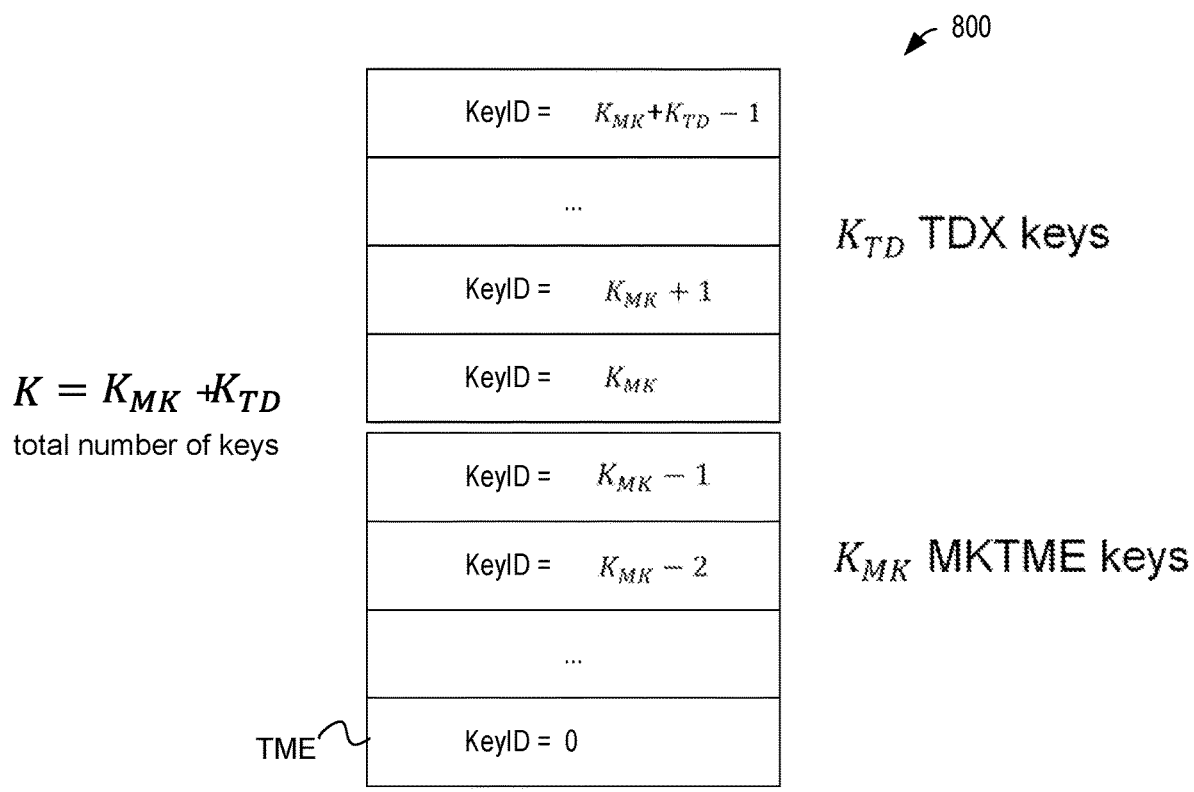
FIG. 8B illustrates encryption key ID space partitioning into TDX and multi-key total memory encryption (MK-TME) key identifiers (IDs) in one implementation.

FIG. 8A is a block diagram of a trust domain (TD) VMCS 138B set up by the SEAM module 137 according to one implementation. In various implementations, after the SEAM module 137 is loaded and is operational to support TDX, the SEAM module 137 sets up the VMCSs 138B for the TDs that are created, one of which is illustrated for purposes of explanation. In implementations, the TD VMCS 138B for a TD includes a shared EPT pointer 802, a secure EPT pointer (SEC_EPTP) 804, and a TD host key ID (HKID) 806. The shared EPT pointer 802 is used to point to a shared EPT 803 which is used to map the shared memory and is built managed by the VMM 140. The VMM 140 specifies the pointer as part of TD build. The secure EPT pointer 804 is built and managed by the SEAM module 137 and the pointer that points to a secure EPT 805 is programmed into the secure EPT pointer 804. The SEAM module 137 may configure the secure EPT pointer 804 and the TD-HKID 806 within the TD VMCS 138B upon build of the TD, which TD VMCS may support multiple VM entries and VM exits thereafter.

In implementations, the secure EPT 803 maps memory that is private to the TD, e.g., code and data of the TD, and is encrypted using a private memory encryption key corresponding to the TD-HKID 806. These private keys are keys that can be used only by the SEAM module 137 and the TDs 150A, 150B, 150C, and the like. The PMH 122 may enforce that the private key IDs are not used for making memory accesses (load/store/code-fetch) when not in the SEAM. The SEAM module 137 builds and manages the secure EPT 805 for the TDs and also assigns the private TD-HKID 806 for the TD virtual machines. By building the secure EPT 805 and making the associated encryption key private, the SEAM module 137 ensures protection from tampering (e.g., by the VMM or other non-SEAM agent) of the memory mapping performed by the secure EPT 805. The SEAM module 137 specifies these to hardware as part of the VM entry to the TD using the following two new fields in the TD VMCS: (1) the secure EPT pointer 804; and (2) the TD-HKID 806.

In one implementation, the secure EPT pointer 804 is a new 64-bit control field to specify the secure EPT 805. In implementations, a first bit (e.g., bit 7) of the secure EPT pointer 804 is defined as an "S-position" bit, where "S" stands for "shared" between the SEAM module 137 and the VMM 140. When this S-position bit is zero ("0"), an indicator bit (e.g., the "S" bit) is in a first position (e.g., position 47) of the GPA and when the S-position bit is a one ("1"), the indicator bit is located at a second position (e.g., position 51) of the GPA. In another implementation, the S bit position is specified by another field of the TD VMCS 138B. The TD OS may set the S-bit position in the GPA to indicate to the PMH 122 a position of the indicator (or "S") bit within the GPA, where the indicator bits indicates whether the TD OS is making a private or a shared memory access. When the S-bit is set to indicate that the TD OS wants to make a shared memory access, then the PMH will translate the GPA to a physical address using the shared EPT 803 and otherwise translate the GPA to a physical address using the secure EPT 805.

In implementations, the TD-HKID 806 is a new 32-bit control field to specify the TD's ephemeral key ID, which corresponds to the private encryption key for the TD. An array of multiple TD-assigned HKIDs may be specified to allow the TD to use more than one key ID, e.g., such that different private memory regions of a given TD may be encrypted and integrity protected using one of the TD-assigned HKIDs. The TD-HKID may be carried along with the physical address in the read or write transaction to the MK-TME 126 and be used by the MK-TME 126 to select the corresponding key with which to perform the memory encryption. The secure EPT 804 may be a 4-level or 5-level EPT (same as configured for the shared EPT by the VMM), for example. The processor 112 may enforce that the number of levels in the two EPTs be identical.

FIG. 8B illustrates encryption key ID space partitioning 800 into TDX and MK-TME key IDs, in one implementation, with a boundary separating private key IDs from shared key IDs. On boot, the BIOS may store within an MSR, a bit range for the key ID encoding. The bit range may support K key IDs to identify K encryption keys. The processor 112 may further identify within the MSR the partitioning 800 of the key ID space. In one implementation, K key IDs may be partitioned into $K_{MK}$ shared key IDs and $K_{TD}$ private key IDs, so that $K_{MK}+K_{TD}=K$. A key ID of zero ("0") may designate a TME key ID for use as the platform reserved key. The shared key IDs may be MK-TME key IDs allocated to the VMM 140 (e.g., for allocation to shared devices) in a virtualization implementation illustrated in FIG. 1A. The MK-TME key IDs may further be allocated to an operating system (or the TDRM 142) in a non-virtualization implementation. The PCONFIG instruction, which is invoked to program an encryption key to a key ID, may enforce use of TDX-reserved key IDs, e.g., the $K_{TD}$ private key IDs, which are more specifically referred to herein as TD host key IDs (TD-HKIDs). For example, the PCONFIG instruction is to deny and cause a fault if the VMM 140 or other privileged software outside the SEAM uses the PCONFIG instruction to attempt to program a key for any of the private key IDs. The PCONFIG instruction can be used within the SEAM, e.g., by the SEAM module 137 to program keys for private key IDs.

The private key IDs may be used only by TDs and the SEAM module 137 and may be partitioned and configuration locked by the MCHEK firmware 162. Accesses with the private key IDs may be performed with WB semantics (CR0.CD is zero) or UC (CR0.CD is 1). Accordingly, the processor core 114 may further execute memory check firmware to: partition key identifier (ID) space, according to a partition set by basic input/output system (BIOS) firmware upon boot, between at least a first range of values that identify private key IDs and a second range of values that identify shared key IDs; and configuration lock the key ID space via setting a lock on the configuration register that is used to configure the key ID space partitioning.

Figure 8C:
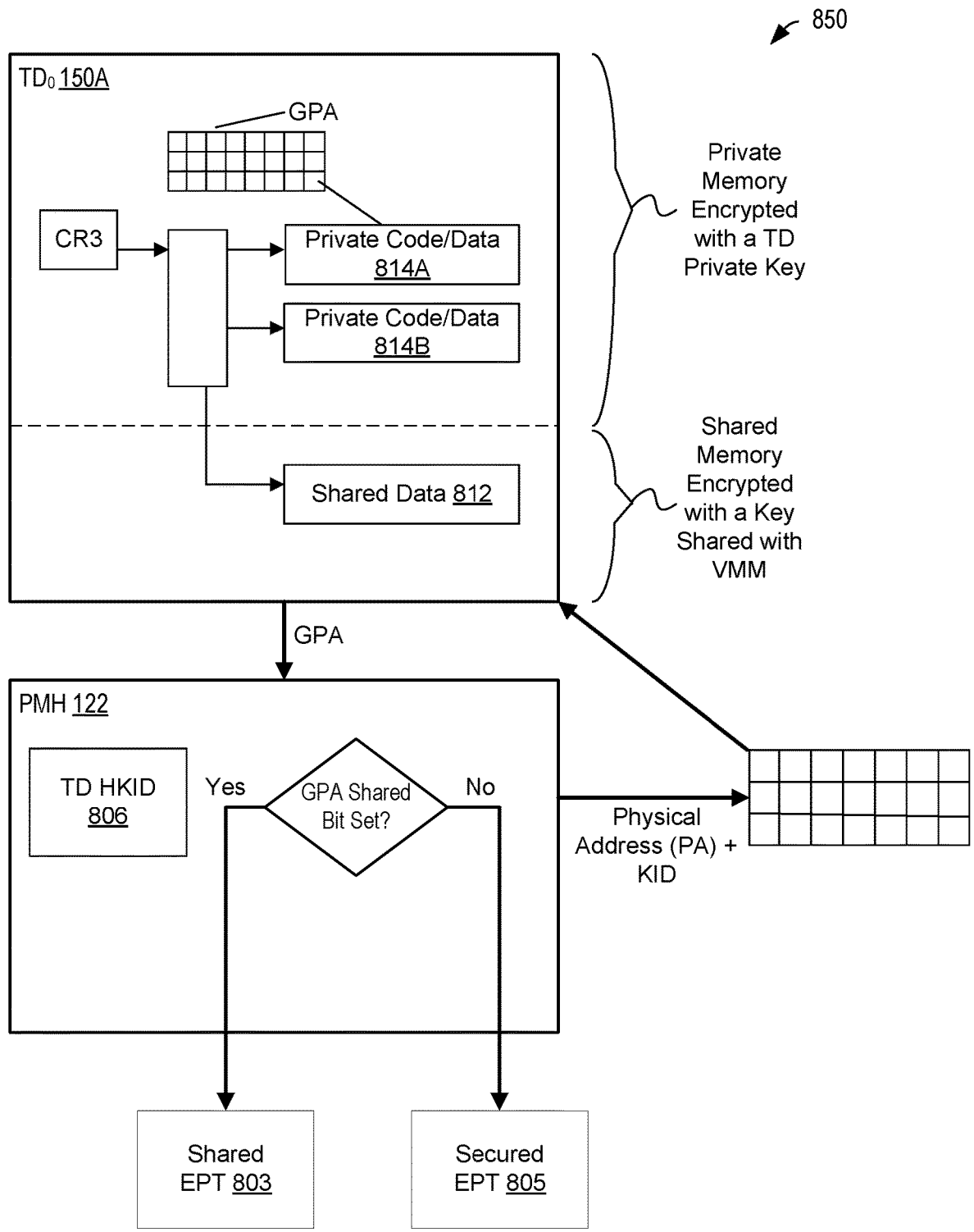
FIG. 8C is a block diagram illustrating how the TD OS can specify whether the TD OS wants to access shared or private memory, and how that is translated using either a shared EPT or a secure EPT, respectively, according to implementations.

FIG. 8C is a block diagram 850 illustrating how the TD OS can specify whether the TD OS wants to access shared or private memory, and how that is translated using either a shared EPT or a secure EPT, respectively, according to implementations. The first TD 150 is depicted, which may access a guest physical address (GPA) and send that GPA to the PMH 122. In implementations, both the TD-HKID 806 and the EPT pointers (both the shared EPT pointer 802 and the secure EPT pointer 804) are configured into the PMH control registers 123 from the VMCS 138B as part of resuming execution of a TD by the VMRESUME microcode. The PMH 122 may access the TD-HKID 806 and the EPT pointers in these PMH control registers 123.

In implementations, the PMH 122 may further determine whether the indicator bit (e.g., the shared or "S" bit) within the GPA is set. If the shared bit is set, the PMH 122 may retrieve the shared EPT pointer 802 from the PMH control registers 123, link to the shared EPT 803, and walk the extended page table entries to determine the physical address (PA). The PMH 122 may then append the shared HKID to the PA. In implementations, the shared HKID is received from a field in the VMCS or a field in the shared EPT. The PMH 122 may then cache this translation along with the shared HKID in the TLB 128. The PMH 122 may then send the read (or write) transaction performed by the instruction invoked by the TD OS to the memory controller 120 along with the PA and the shared HKID. Subsequent accesses to that page may hit the TLB 128 and thus use the cached HKID and PA.

In further implementations, if the indicator bit in the GPA is not set, the PMH 122 may retrieve the secure EPT pointer 804 from the PMH control registers 123, link to the secure EPT 805, and walk the extended page table entries of the secure EPT 805 to determine the PA. The PMH 122 may then transmit the PA and the TD-HKID 870 (which was determined to be the private HKID associated with the first TD 150A) to the first TD. The first TD may then retrieve private code and/or data 814A and/or 814B from the PA and decrypt that private code and/or data using the private HKID. The PMH 122 may then cache this translation along with the TD-HKID in the TLB 128. The PMH 122 may then send the read (or write) transaction performed by the instruction invoked by the TD OS to the memory controller 120 along with the PA and the TD-HKID. Subsequent accesses to that page may hit the TLB 128 and thus use the cached TD-HKID and PA.

Figure 9A:
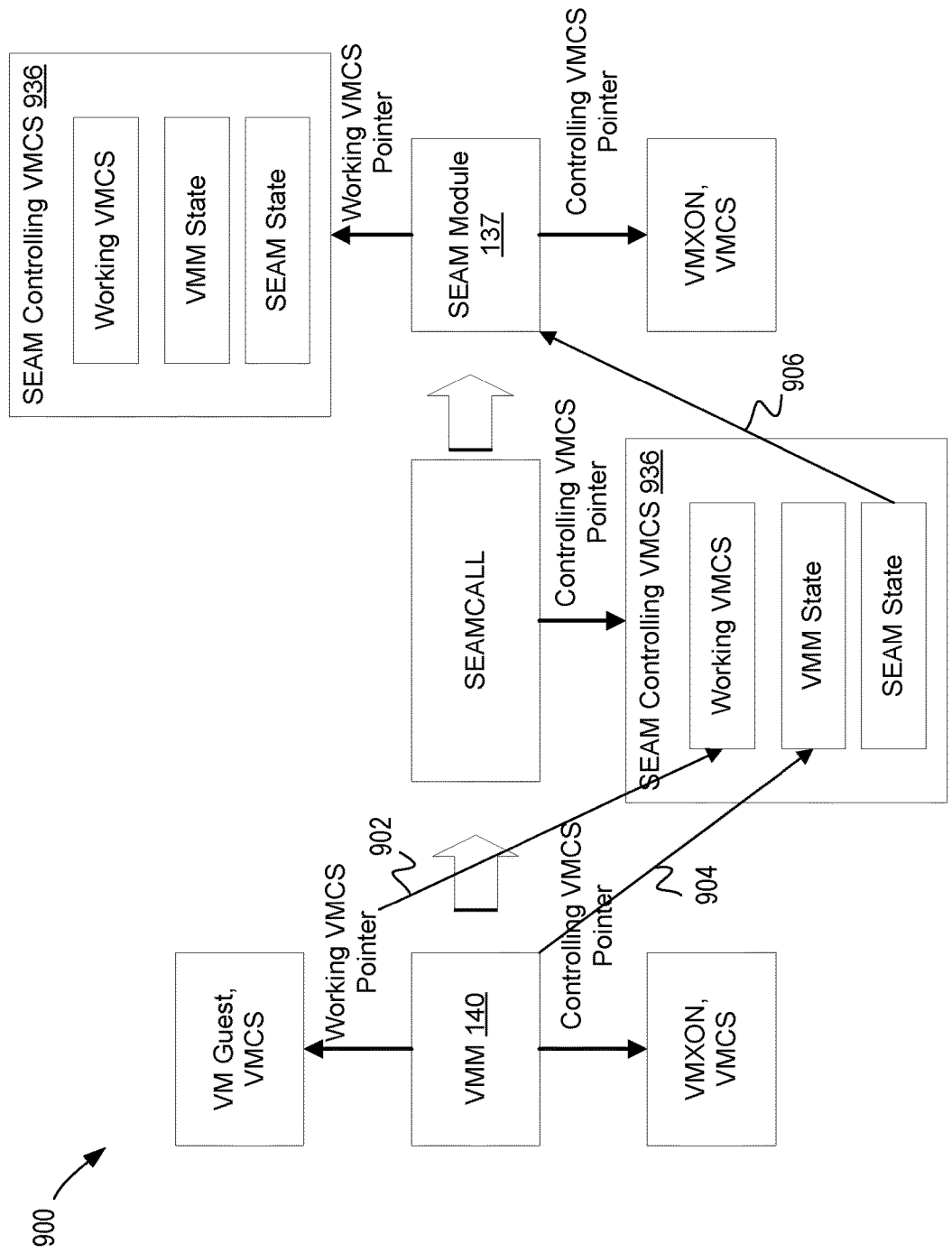
FIG. 9A is a flow diagram illustrating deployment of VMCSs to store a VMM state and load a SEAM state during execution of a SEAMCALL instruction according to an implementation.

FIG. 9A is a flow diagram 900 illustrating deployment of VMCSs to store a VMM state and load a SEAM state during execution of a SEAMCALL instruction according to an implementation. In implementations, the VMM 140 is provided with the SEAMCALL instruction to transition logical processor into the secure arbitration mode (SEAM) and transfer control to the SEAM module 137. The SEAM functions that may be invoked by the VMM 140 via the SEAMCALL instruction include creation of a TD, addition of pages to a TD, and entrance into a TD. The SEAM module 137 may be understood to be a VMX root mode library, e.g., so the SEAMCALL can provide entrance into the SEAM VMX root mode of operation. The call generated by the SEAMCALL instruction is reported to the SEAM module 137 as a VM exit. The SEAMCALL instruction may register the exit reason as SEAMCALL.

More specifically, with reference to FIG. 9A, the VMM 140 may reference a working VMCS pointer (labeled "working" to distinguish from "controlling" VMCS of the SEAM) associated with a VM guest. In implementations, the VMM 140, upon invocation of the SEAMCALL instruction, may cause the processor core 114 to store the current working VMCS pointer into a SEAM controlling VMCS 936, illustrated by a first arrow 902 going from the working VMCS pointer to the VMCS field. The SEAMCALL then causes the VMM state to be saved into the guest state area of that SEAM controlling VMCS 936, illustrated by a second arrow 904 from the VMM 140 to the VMM state field. The SEAMCALL may then load/force state from the VMCS host state area to setup the state for the SEAM module 137, illustrated by a third arrow 906 going from the host state area of the SEAM controlling VMCS 936 to the SEAM module 137. Finally, the pointers are adjusted such that at end of the SEAMCALL instruction, the working VMCS is the SEAM VMCS itself, e.g., the controlling VMCS becomes the working VMCS. Furthermore the controlling VMCS is pointed to the VMXON VMCS, e.g., the default VMCS established at VMXON.

Further, in execution of the SEAMCALL instruction, system management interrupts (SMIs) and non-maskable interrupts (NMIs), among other events, may also be inhibited. The controlling VMCS exit reason may be recorded as SEAMCALL, a controlling VMCS pointer may be linked to the working VMCS, and the working VMCS may be replaced with the controlling VMCS. In some implementations, attempts to execute VMCALL, VMXOFF, GETSEC, or other instructions that may cause illegal transitions out of the SEAM, or compromise the SEAM, while in SEAM VMX root mode will cause a general protection.

Figure 9B:
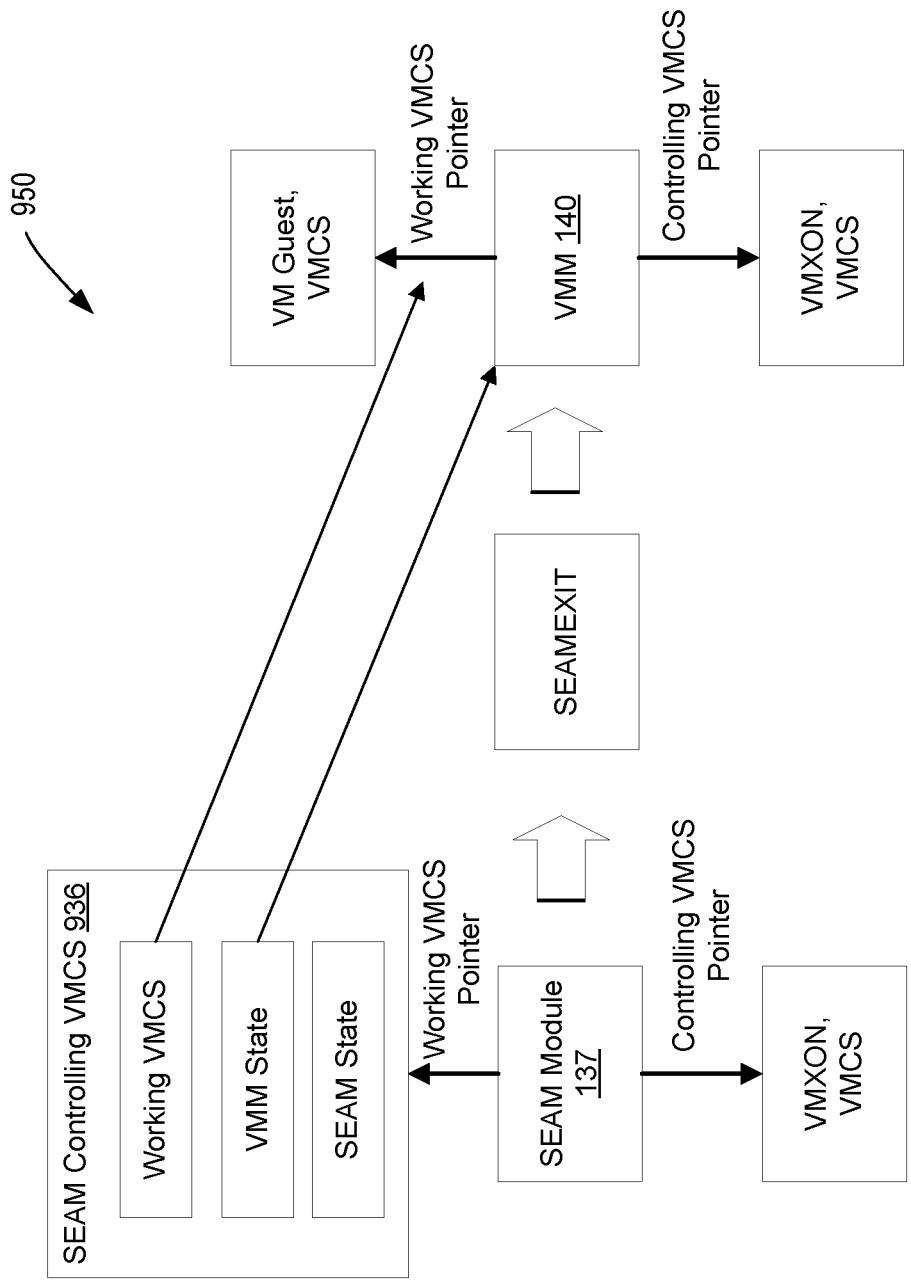
FIG. 9B is a flow diagram illustrating execution of the SEAMEXIT instruction according to an implementation.

FIG. 9B is a flow diagram 950 illustrating execution of the SEAMEXIT instruction according to an implementation. The SEAMEXIT instruction may be invoked by the SEAM module 137, which allows the SEAM VMX root mode software to exit from the SEAM VMX root mode and resume execution of the untrusted VMM 140 in legacy VMX root operation. Accordingly, the SEAMEXIT instruction performs a reverse operation of that illustrated with reference to the SEAMCALL instruction in FIG. 9A. The execution of the VMM 140 then resumes from the point at which the SEAMCALL instruction caused the prior successful entry to the SEAM VMX root mode, e.g., activation of the SEAM module 137 as discussed in FIG. 9A.

For example, in one implementation, the state of the VMM (in legacy VMX root mode) is loaded from the guest state area of the working VMCS based on entry controls. Note that for SEAMCALL/SEAMEXIT instructions, the VMM 140 is the "guest" and SEAM module 137 is the "host." Further, the VMM 140 may restore event inhibits (NMI, SMI) from guest interruptibility status fields of the SEAM controlling VMCS 936. The pointers are again adjusted such that at the end of the SEAMEXIT instruction, the working VMCS becomes the VMCS for a VM guest and the controlling VMCS is pointed to the VMXON VMCS, e.g., the default VMCS established on VMXON. The secure arbitration mode (SEAM) may then be successfully exited.

Figure 10:
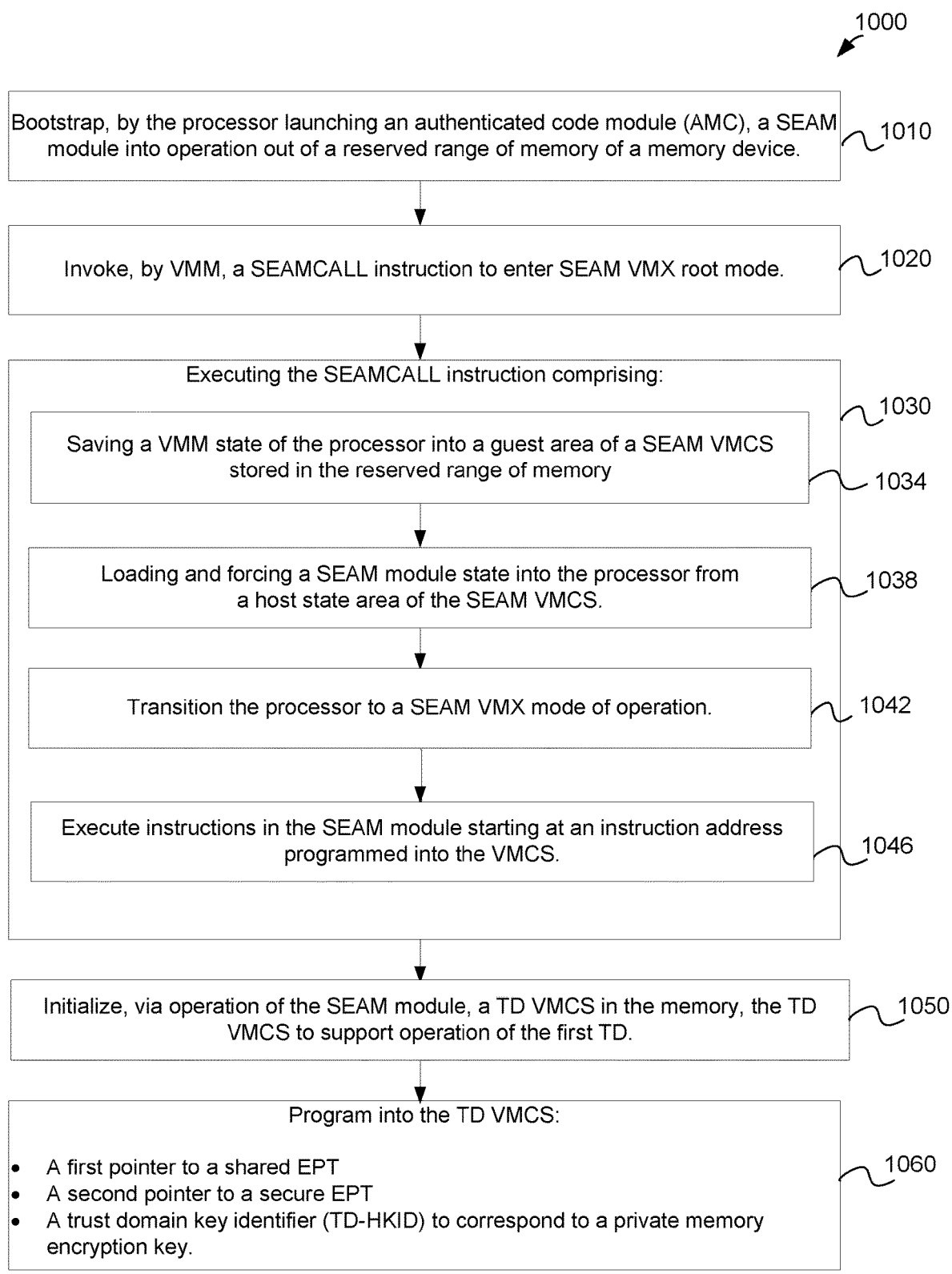
FIG. 10 is a flow diagram of a method of using bootstrapping operation of a SEAM module out of a reserved range of memory and to which is transferred virtual root mode operational control upon invoking a SEAMCALL instruction according to an implementation.

FIG. 10 is a flow diagram of a method 1000 of using bootstrapping operation of a SEAM module out of a reserved range of memory and to which is transferred virtual root mode operational control upon invoking a SEAMCALL instruction, according to one implementation. Method 1000 may be performed by processing logic that may include hardware (e.g., circuitry, dedicated logic, programmable logic, microcode, etc.), software, firmware or a combination thereof. In one implementation, method 1000 is performed by the processor 112 of FIG. 1A. In another implementation, the method 1000 is performed by any of the processing devices described with respect to FIG. 11A through FIG. 21. Alternatively, other components of the computing system 100 (or software executing on the processor 112) may perform some or all of the operations of the method 1000.

With reference to FIG. 10, the method 1000 may start with the processing logic bootstrapping, by launching an authenticated code module, a secure arbitration mode (SEAM) module into operation out of a reserved range of memory within a memory device coupled to the processor (1010). The method 1000 may continue with the processing logic invoking, by a VMM of the processor, a SEAM call (SEAMCALL) instruction (1020). The method 1000 may continue with the processing logic executing the SEAM-CALL instruction according to the following steps (1030). For example, the executing may begin with the processing logic saving a VMM state of the processor into a guest area of a SEAM virtual machine control structure (VMCS) stored in the reserved range of the memory (1034), loading and forcing a SEAM module state into the processor from a host state area of the SEAM VMCS (1036), transitioning the processor to a SEAM virtual root mode of operation (1042), and executing instructions in the SEAM module starting at an instruction address programmed into the SEAM VMCS (1046). The method 1000 may continue with the processing logic initializing, via operation of the SEAM module, a trust domain (TD) virtual machine control structure (VMCS) in the memory, the TD VMCS to support operation of a first TD (1050).

With additional reference to FIG. 10, the method 100 may continue with the processing logic programming, into the TD VMCS, a first pointer to a shared extended page table (EPT), the shared EPT being shared with the VMM to access shared memory of the memory device; a second pointer to a secure EPT, wherein the secure EPT is accessible by the SEAM module to access private memory of the memory device; and a trust domain host key identifier (TD-HKID) to correspond to a private memory encryption key, wherein the private memory encryption key programmed for the TD-HKID is unknown to the VMM (1060).

In operation, when the processor 112 operates in the SEAM, the SEAM module 137 may perform privileged instructions and operations not accessible to the processor 112 when operating outside of the SEAM. For example, the processor 112 may allow the SEAM module 137 to invoke second instructions that are inaccessible by the processor in operation outside of the SEAM. These second instructions may include a number of operations, such as a processor configure (PCONFIG) operation that is to program a private memory encryption key to correspond to the TD-HKID of a TD; inhibiting, in response to execution of a SEAMCALL instruction, a system management interrupt (SMI) and a non-maskable interrupt (NMI) of the processor; programming the TD-HKID of a TD into the TD VMCS; and programming the secure EPT pointer of the TD into the TD VMCS, among many other operations disclosed herein as executable by the SEAM module 137.

In various implementations, the SEAM module 170 invokes the VMRESUME or VMLAUNCH instructions in SEAM VMX root mode to enter the TD. More specifically, the VMRESUME instruction may cause a store of the SEAM module state of the processor into the host state area of the TD VMCS, a load of a TD state of the TD to be loaded into the processor from the guest area of the TD VMCS, and a transition into the SEAM VMX non-root mode, resuming execution of instructions in the TD. Upon a subsequent VM exit from the TD, the processor 112 may save the TD state of the processor into the TD VMCS guest state area that was used to resume the TD. Subsequent to saving the TD state into the VMCS, the processor 112 may load the SEAM module state from the TD VMCS host state area back into the processor. The saving of the TD state and the loading of the SEAM module state may be controlled by the exit control fields in the TD VMCS. Subsequent to loading the processor state from the host state area of the TD VMCS, the processor transitions to SEAM VMX root mode and starts executing instructions in the SEAM module.

With additional reference to FIGS. 1A and 1B, the following additional actions may be performed by the VMRESUME and VMLAUNCH instructions in SEAM VMX root mode. If the enable EPT VM-execution control bit of the TD VMCS is zero ("0"), these instructions may cause VM entry failure due to an invalid control field. If the enable EPT VM-execution control bit is one ("1"), however, the secure EPT pointer VM-execution control field is to satisfy the following predetermined criteria: (a) the EPT memory type (bits 2:0) is to be a value supported by the processor 112; (b) bits 5:3 (1 less than the EPT page-walk length) is to be valid; (c) bit 6 (enable bit for accessed and dirty flags for EPT) is to be zero ("0") if processor does not support EPT A/D; and (d) reserved bits 11:8 and 63:N (where N is the processor's physical-address width) are to be zero ("0).

If these first set of checks succeed, then the secure EPT pointer and TD-HKID values are programmed into the PMH control registers. The VM entry then uninhibits system management interrupts (SMI). More specifically, if the logical processor is in the SEAM VMX root mode, and an SMI occurs, the SMI stays pending in hardware until uninhibited after the above checks have been cleared. Thus, the SMI is "held" until can exit out of the SEAM VMX root mode into legacy VMX root mode using the SEAMEXIT instruction. Further, inhibits on non-maskable interrupts (NMI) may be restored from guest interruptibility state normally. Similarly, here the NMI will be "held" until out of SEAM VMX root mode.

In related implementations, the following additional actions may be performed by VMRESUME and VMLAUNCH instruction in SEAM VMX root mode. The VMRESUME and VMLAUNCH instruction may verify that the TD-HKID, stored in the controlling VMCS, is non-zero and is a private key ID. Further, the SEAM module 137 may modify the calculation of the address space identifier (ASID) with which to tag addresses of the TD in a translation look-aside buffer (TLB) 128 of the processor 112 as follows. First, the pointer of the secure EPT (SEC_EPTP) is used in lieu of a shared EPT pointer at which to locate extended pages tables for address translations. Second, a trust domain (TD) bit of the ASID may be set (e.g., to "1") to indicate association with the SEAM mode, wherein the ASID is unrecognizable to the VMM. This is because TLB entries are tagged with this ASID and the ASID created in SEAM mode will not be usable outside SEAM mode as the TD bit of the ASID is always not set (e.g., "0") outside the SEAM. In one implementation, the TD bit is bit 16 of the virtual processor ID (VPID) of the ASID, although other bits may also be purposed for the TD bit.

These modifications of the ASID impact the virtual address to physical address translations performed by the SEAM module (or by a TD in operation out of the SEAM library), e.g., to prevent collisions between addresses created by the SEAM module 137 (and TDs) and those created by the VMM, legacy VMs, and other software entities that execute outside of SEAM mode. This prevention recognizes the lack of trust the SEAM has that the VMM allocates a unique ASID for the legacy VMs. The TD mode bit may create a new address space ID that is unique for the SEAM. In this way, addresses referenced by the PMH 122 created by the SEAM module 137 (or TDs) are tagged with an ASID that cannot be used by the VMM 140. The differentiation of this address space is particularly useful due to the secure EPTs being separate from the shared EPTs, each of which may use different information to tag TLB entries for different virtual-to-physical address mappings.

In related implementations, the following additional action may be performed by VMRESUME and VMLAUNCH instruction in SEAM VMX root mode. Namely, a TD mode bit may be noted as being set, e.g., as a one ("1") and thus associated with the or a TD. The TD mode bit is used to make decisions in the processor dependent on being a TD guest versus a VM guest. For example, this decision on treatment of SMI is based on this TD mode bit. Additionally, SMI treatment while in the TD guest mode was discussed previously. When the processor 112 observes an SMI in TD guest mode, processing logic may cause a VM exit to the SEAM library with exit reason set to "SMI VM Exit." The observed SMI remains pending following the VM exit. Further, upon VMEXIT from TD guest mode may cause execution of two additional actions. First, the NMI and SMI may be inhibited. Second, the TD mode bit may be cleared, e.g., to zero ("0").

FIG. 11A is a block diagram illustrating a micro-architecture for a processor or an integrated circuit that may implement hardware support for a SEAM of a computing device to build and operate within TDX, according to an implementation of the disclosure. Specifically, processor 1100 depicts an in-order architecture core and a register renaming logic, out-of-order issue/execution logic to be included in a processor according to at least one implementation of the disclosure.

Processor 1100 includes a front end unit 1130 coupled to an execution engine unit 1150, and both are coupled to a memory unit 1170. The processor 1100 may include a reduced instruction set computing (RISC) core, a complex instruction set computing (CISC) core, a very long instruction word (VLIW) core, or a hybrid or alternative core type. As yet another option, processor 1100 may include a special-purpose core, such as, for example, a network or communication core, compression engine, graphics core, or the like. In one implementation, processor 1100 may be a multi-core processor or may be part of a multi-processor system.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1140 may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different scheduler circuits, including reservations stations (RS), central instruction window, etc. The scheduler unit(s) 1156 is coupled to the physical register set unit(s) 1158. Each of the physical register set units 1158 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set unit(s) 1158 is overlapped by the retirement unit 1154 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register set unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 1156, physical register set unit(s) 1158, and execution cluster(s) 1160 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set unit, and/or execution cluster—and in the case of a separate memory access pipeline, certain implementations are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which may include a data prefetcher 1180, a data TLB unit 1172, a data cache unit (DCU) 1174, and a level 2 (L2) cache unit 1176, to name a few examples. In some implementations DCU 1174 is also known as a first level data cache (L1 cache). The DCU 1174 may handle multiple outstanding cache misses and continue to service incoming stores and loads. It also supports maintaining cache coherency. The data TLB unit 1172 is a cache used to improve virtual address translation speed by mapping virtual and physical address spaces. In one exemplary implementation, the memory access units 1164 may include a load unit, a store address unit, and a store data unit, each of which is coupled to the data TLB unit 1172 in the memory unit 1170. The L2 cache unit 1176 may be coupled to one or more other levels of cache and eventually to a main memory.

In one implementation, the data prefetcher 1180 speculatively loads/prefetches data to the DCU 1174 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1100 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 11B is a block diagram illustrating an in-order pipeline and a register renaming stage, out-of-order issue/execution pipeline implemented by processor 1100 of FIG. 11A according to some implementations of the disclosure. The solid lined boxes in FIG. 11B illustrate an in-order pipeline 1101, while the dashed lined boxes illustrate a register renaming, out-of-order issue/execution pipeline 1103. In FIG. 11B, the pipelines 1101 and 1103 include a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1120, and a commit stage 1122. In some implementations, the ordering of stages 1102-1124 may be different than illustrated and are not limited to the specific ordering shown in FIG. 11B.

Figure 12:
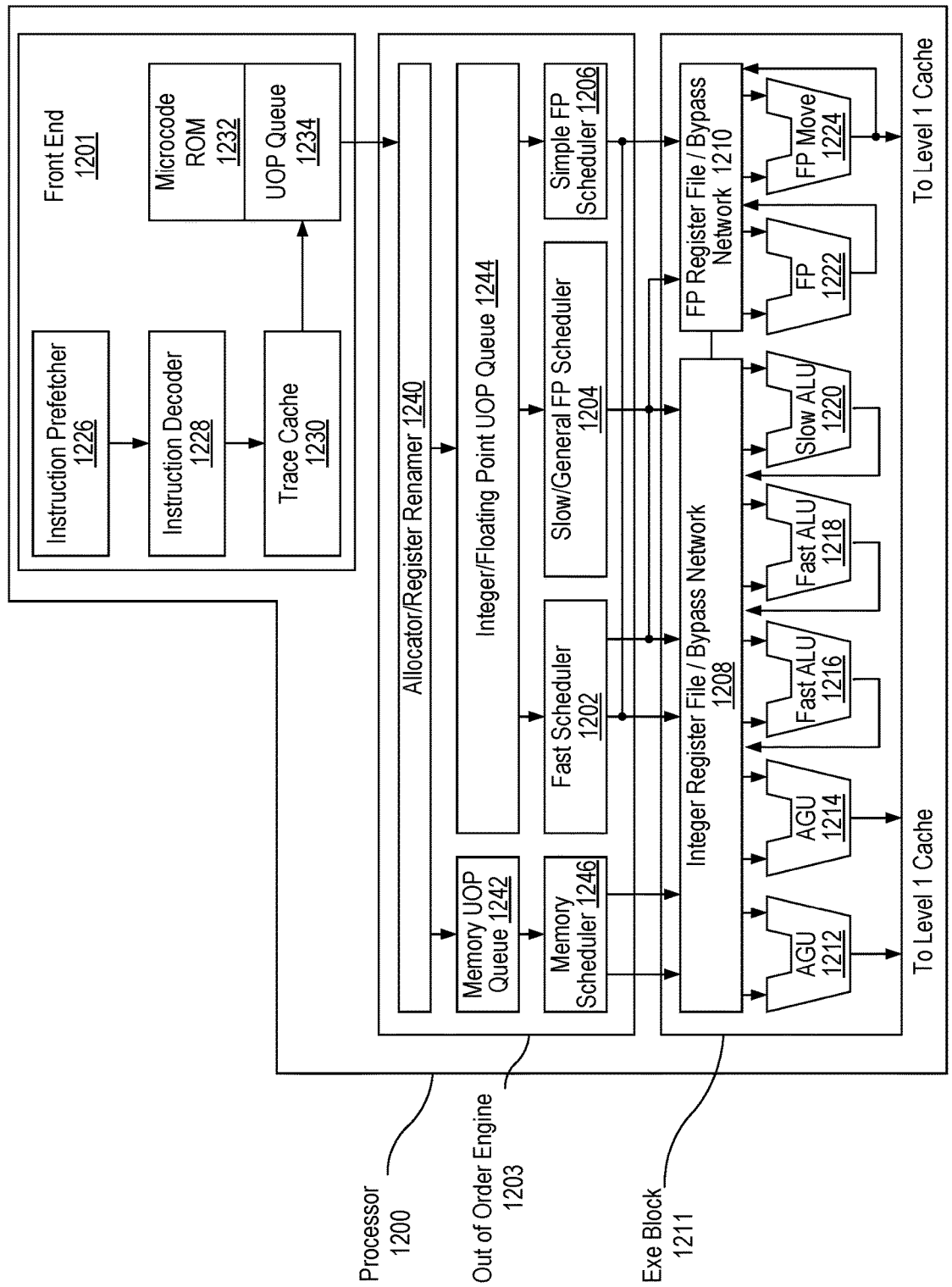
FIG. 12 illustrates a block diagram of the micro-architecture for a processing device that includes logic circuits to provide secure arbitration mode (SEAM) capability for TDX operation according to one implementation.

FIG. 12 illustrates a block diagram of the micro-architecture for a processing device 1200 that includes logic circuits that includes logic circuits to provide secure arbitration mode (SEAM) capability for TDX operation according to at least one implementation of the disclosure. In some implementations, an instruction may be implemented to operate on data elements having sizes of byte, word, doubleword, quadword, etc., as well as datatypes, such as single and double precision integer and floating point datatypes. In one implementation the in-order front end 1201 is the part of the processing device 1200 that fetches instructions to be executed and prepares them to be used later in the processing device pipeline. The implementations of providing co-existence of trust domain architecture with multi-key total memory encryption technology may be implemented in processing device 1200.

The front end 1201 may include several units. In one implementation, the instruction prefetcher 1226 fetches instructions from memory and feeds them to an instruction decoder 1228 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1230 takes decoded uops and assembles them into program ordered sequences or traces in the uop queue 1234 for execution. When the trace cache 1230 encounters a complex instruction, the microcode ROM 1232 provides the uops needed to complete the operation.

Some instructions are converted into a single micro-op, whereas others need several micro-ops to complete the full operation. In one implementation, if more than four micro-ops are needed to complete an instruction, the decoder 1218 accesses the microcode ROM 1232 to do the instruction. For one implementation, an instruction may be decoded into a small number of micro ops for processing at the instruction decoder 1228. In another implementation, an instruction may be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one implementation from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The allocator/register renaming logic 1240 renames logic registers onto entries in a register file. The allocator 1240 also allocates an entry for each uop in one of the two uop queues, one for memory operations 1242 and one for non-memory operations 1244, in front of the instruction schedulers: memory scheduler 1246, fast scheduler 1202, slow/general floating point scheduler 1204, and simple floating point scheduler 1206. The uop schedulers 1202, 1204, 1206, determine when a uop is ready to execute based on the readiness of their dependent input register operand sources and the availability of the execution resources the uops need to complete their operation. The fast scheduler 1202 of one implementation may schedule on each half of the main clock cycle while the other schedulers may only schedule once per main processing device clock cycle. The schedulers arbitrate for the dispatch ports to schedule uops for execution.

Register files 1208, 1210, sit between the schedulers 1202, 1204, 1206, and the execution units 1212, 1214, 1216, 1218, 1220, 1222, 1224 in the execution block 1211. There is a separate register file 1208, 1210, for integer and floating point operations, respectively. Each register file 1208, 1210, of one implementation also includes a bypass network that may bypass or forward just completed results that have not yet been written into the register file to new dependent uops. The integer register file 1208 and the floating point register file 1210 are also capable of communicating data with the other. For one implementation, the integer register file 1208 is split into two separate register files, one register file for the low order 32 bits of data and a second register file for the high order 32 bits of data. The floating point register file 1210 of one implementation has 128 bit wide entries because floating point instructions typically have operands from 64 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions need to execute. The processing device 1200 of one implementation is comprised of a number of execution units: address generation unit (AGU) 1212, AGU 1214, fast ALU 1216, fast ALU 1218, slow ALU 1220, floating point ALU 1222, floating point move unit 1224. For one implementation, the floating point execution blocks 1212, 1214, execute floating point, MMX, SIMD, and SSE, or other operations. The floating point ALU 1212 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1216, 1218. The fast ALUs 1216, 1218, of one implementation may execute fast operations with an effective latency of half a clock cycle. For one implementation, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1212, 1214. For one implementation, the integer ALUs 1216, 1218, 1220, are described in the context of performing integer operations on 64 bit data operands. In alternative implementations, the ALUs 1216, 1218, 1220, may be implemented to support a variety of data bits including 16, 32, 128, 256, etc. Similarly, the floating point units 1222, 1224, may be implemented to support a range of operands having bits of various widths. For one implementation, the floating point units 1222, 1224, may operate on 128 bits wide packed data operands in conjunction with SIMD and multimedia instructions.

In one implementation, the uops schedulers 1202, 1204, 1206, dispatch dependent operations before the parent load has finished executing. As uops are speculatively scheduled and executed in processing device 1200, the processing device 1200 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 1200 also includes logic to provide co-existence of trust domain architecture with multi-key total memory encryption technology according to one implementation. In one implementation, the execution block 1211 of processing device 1200 may include TDRM 142, MOT 126, and TDCS to provide co-existence of trust domain architecture with multi-key total memory encryption technology, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, California. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 13:
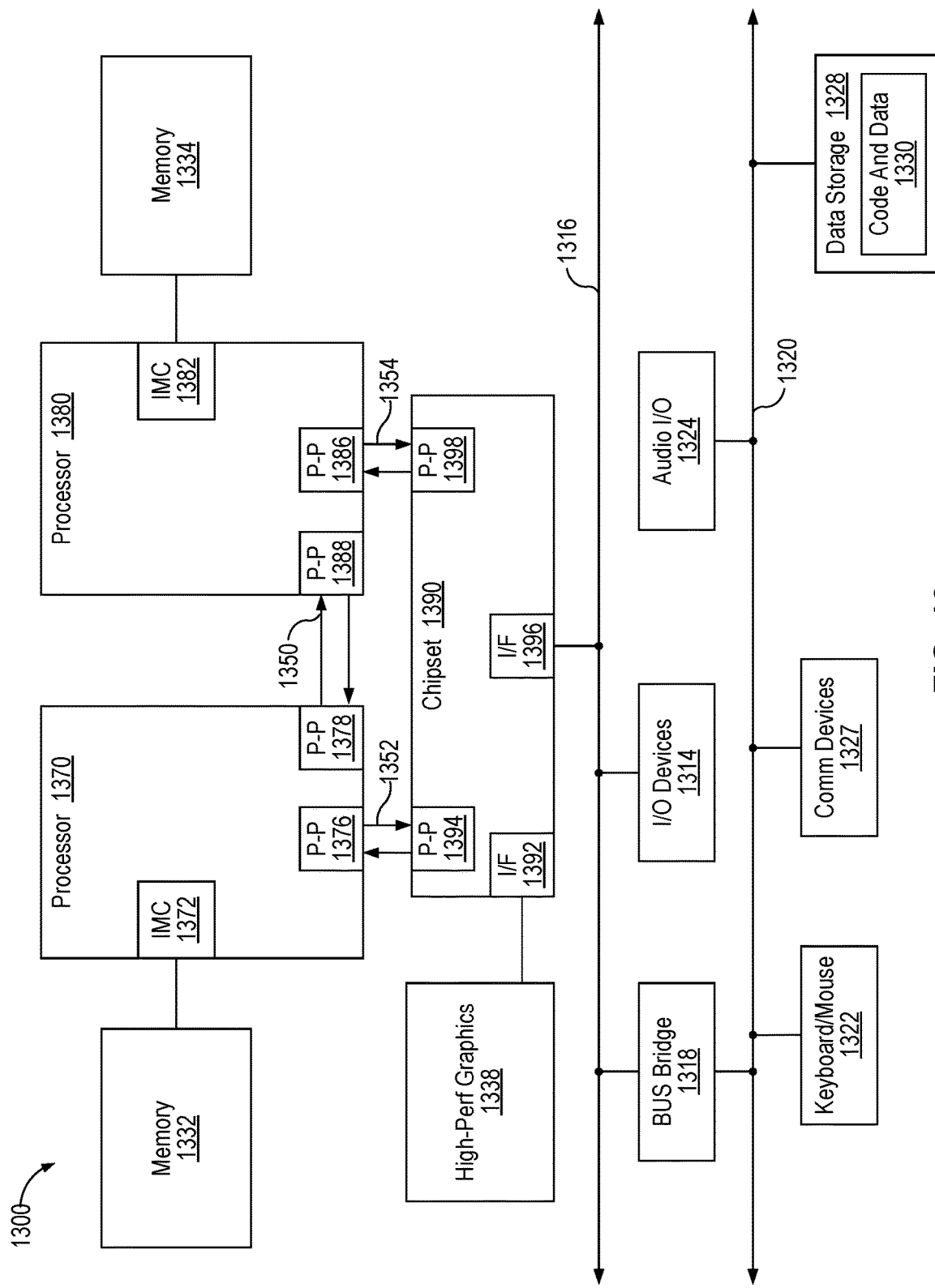
FIG. 13 is a block diagram of a computer system according to one implementation.

Implementations to provide secure arbitration mode (SEAM) capability for TDX operation may be implemented in many different system types. Referring now to FIG. 13, shown is a block diagram of a multiprocessing device system 1300 in accordance with an implementation. As shown in FIG. 13, multiprocessing device system 1300 is a point-to-point interconnect system, and includes a first processing device 1370 and a second processing device 1380 coupled via a point-to-point interconnect 1350. As shown in FIG. 13, each of processing devices 1370 and 1380 may be multicore processing devices, including first and second processing device cores (not shown), although potentially many more cores may be present in the processing devices.

The processing devices each may include hybrid write mode logics in accordance with an implementation of the present. The implementations to provide co-existence of trust domain architecture with multi-key total memory encryption technology may be implemented in the processing device 1370, processing device 1380, or both.

While shown with two processing devices 1370, 1380, it is to be understood that the scope of the disclosure is not so limited. In other implementations, one or more additional processing devices may be present in a given processing device.

Processors 1370 and 1380 are shown including integrated memory controller units (IMCs) 1372 and 1382, respectively. Processing device 1370 also includes as part of its bus controller units point-to-point (P-P) interfaces 1376 and 1378; similarly, second processing device 1380 includes P-P interfaces 1386 and 1388. Processing devices 1370, 1380 may exchange information via a point-to-point (P-P) interface 1350 using P-P interface circuits 1378, 1388. As shown in FIG. 13, IMCs 1372 and 1382 couple the processing devices to respective memories, namely a memory 1332 and a memory 1334, which may be portions of main memory locally attached to the respective processing devices.

Processors 1370, 1380 may each exchange information with a chipset 1390 via individual P-P interfaces 1352, 1354 using point to point interface circuits 1376, 1394, 1386, 1398. Chipset 1390 may also exchange information with a high-performance graphics circuit 1338 via a high-performance graphics interface 1392.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 1390 may be coupled to a first bus 1316 via an interface 1396. In one implementation, first bus 1316 may be a Peripheral Component Interconnect (PCI) bus, or a bus such as a PCI Express bus or another third generation I/O interconnect bus, although the scope of the disclosure is not so limited.

As shown in FIG. 13, various I/O devices 1314 may be coupled to first bus 1316, along with a bus bridge 1318 which couples first bus 1316 to a second bus 1320. In one implementation, second bus 1320 may be a low pin count (LPC) bus. Various devices may be coupled to second bus 1320 including, for example, a keyboard and/or mouse 1322, communication devices 1327 and a storage unit 1328 such as a disk drive or other mass storage device which may include instructions/code and data 1330, in one implementation. Further, an audio I/O 1324 may be coupled to second bus 1320. Note that other architectures are possible. For example, instead of the point-to-point architecture of FIG. 13, a system may implement a multi-drop bus or other such architecture.

Figure 14:
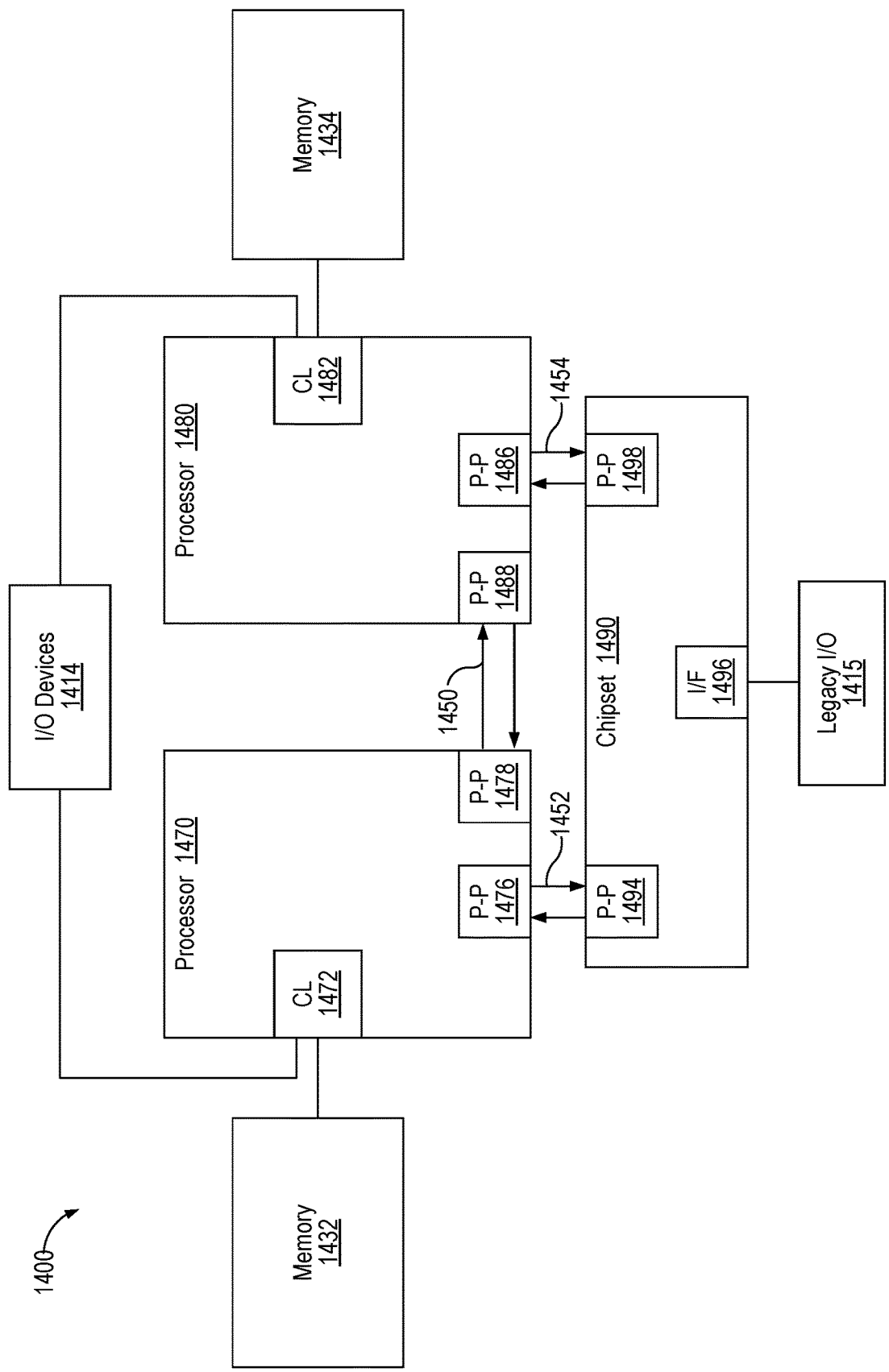
FIG. 14 is a block diagram of a computer system according to another implementation.

Referring now to FIG. 14, shown is a block diagram of a third system 1400 in accordance with an implementation of the disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates processors 1470, 1480. In one embodiment, processors 1470, 1480 may implement hybrid cores. Processors 1470, 1480 may include integrated memory and I/O control logic ("CL") 1472 and 1482, respectively, and intercommunicate with each other via point-to-point interconnect 1450 between point-to-point (P-P) interfaces 1478 and 1488 respectively. Processors 1470, 1480 each communicate with chipset 1490 via point-to-point interconnects 1452 and 1454 through the respective P-P interfaces 1476 to 1494 and 1486 to 1498 as shown. For at least one implementation, the CL 1072, 1082 may include IMCs 1472, 1482 as described herein. In addition, CL 1472, 1482 may also include I/O control logic. FIG. 14 illustrates that the memories 1432, 1434 are coupled to the CL 1472, 1482, and that I/O devices 1414 are also coupled to the CL 1472, 1482. Legacy I/O devices 1415 are coupled to the chipset 1490 via interface 1496. The implementations to provide co-existence of trust domain architecture with multi-key total memory encryption technology may be implemented in processing device 1470, processing device 1480, or both.

Figure 15:
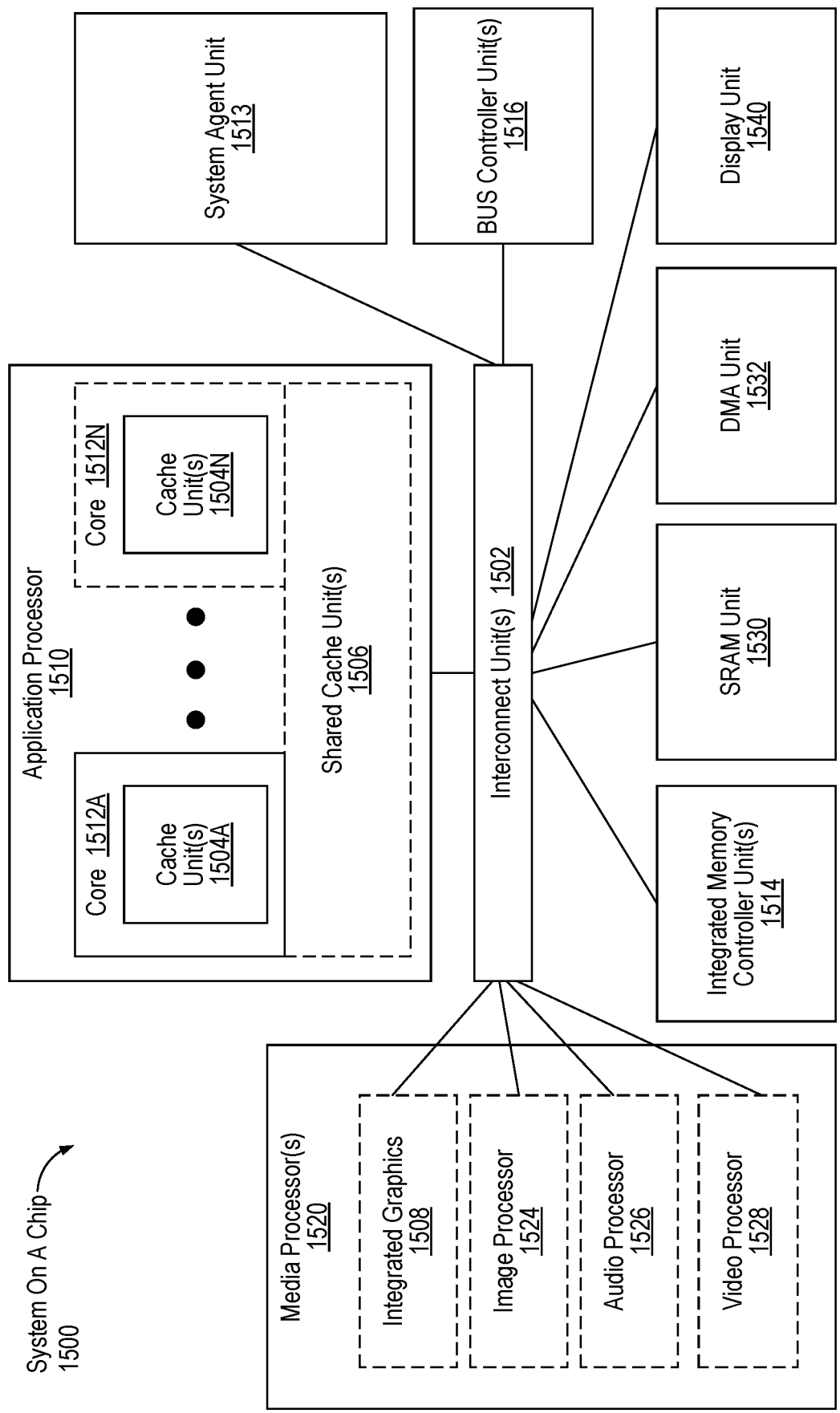
FIG. 15 is a block diagram of a system-on-a-chip according to one implementation.

FIG. 15 is an example system on a chip (SoC) 1500 that may include one or more of the cores 1512A . . . 1512N of the application processor 1510. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 15, shown is a block diagram of a SoC 1500 in accordance with an implementation of the disclosure. Also, dashed lined boxes are features on more advanced SoCs. In FIG. 15, an interconnect unit(s) 1502 is coupled to: the application processor 1510 which includes a set of one or more cores 1512A-N, containing one or more cache unit(s) 1504A . . . 1504N, respectively, and shared cache unit(s) 1506; a system agent unit 1513; a bus controller unit(s) 1516; an integrated memory controller unit(s) 1514; a set or one or more media processing devices 1520 which may include integrated graphics logic 1508, an image processing device 1524 for providing still and/or video camera functionality, an audio processing device 1526 for providing hardware audio acceleration, and a video processing device 1528 for providing video encode/decode acceleration; a static random access memory (SRAM) unit 1530; a direct memory access (DMA) unit 1532; and a display unit 1540 for coupling to one or more external displays. The implementations to provide co-existence of trust domain architecture with multi-key total memory encryption technology may be implemented in SoC 1500.

Figure 16:
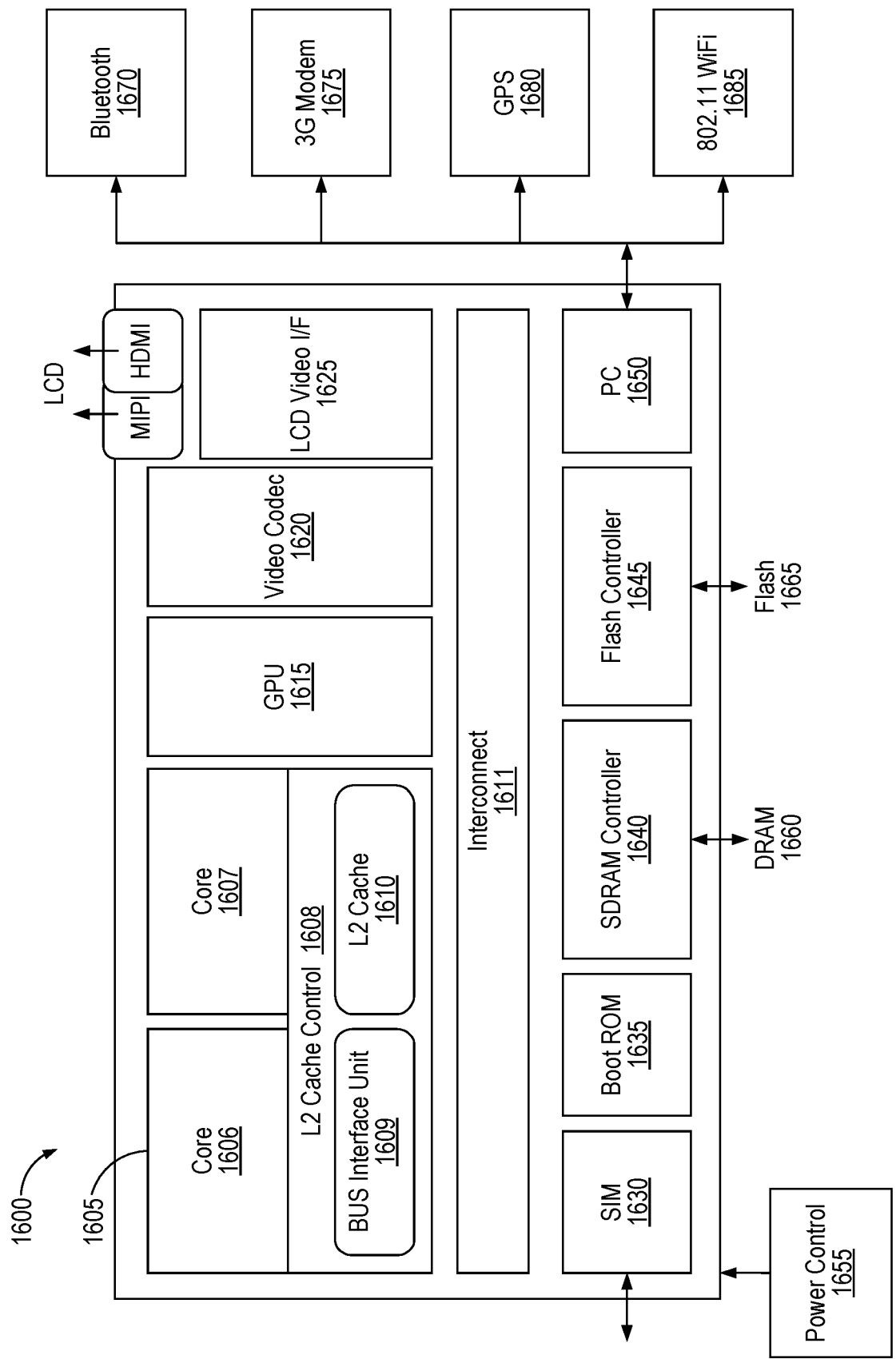
FIG. 16 illustrates another implementation of a block diagram for a computing system.

Turning next to FIG. 16, an implementation of an SoC design in accordance with implementations of the disclosure is depicted. As an illustrative example, SoC 1600 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The implementations to provide co-existence of trust domain architecture with multi-key total memory encryption technology may be implemented in SoC 1600.

Here, SoC 1620 includes 2 cores-1606 and 1607. Similar to the discussion above, cores 1606 and 1607 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1606 and 1607 are coupled to cache control 1608 that is associated with bus interface unit 1609 and L2 cache 1610 to communicate with other parts of system 1600. Interconnect 1611 includes an on-chip interconnect, such as an IOSF, AMBA, or other interconnects discussed above, which may implement one or more aspects of the described disclosure.

Interconnect 1611 provides communication channels to the other components, such as a Subscriber Identity Module (SIM) 1630 to interface with a SIM card, a boot ROM 1635 to hold boot code for execution by cores 1606 and 1607 to initialize and boot SoC 1600, a SDRAM controller 1640 to interface with external memory (e.g. DRAM 1660), a flash controller 1645 to interface with non-volatile memory (e.g. Flash 1665), a peripheral control 1650 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the implementations described herein.

In addition, the system illustrates peripherals for communication, such as a power control module 1655, Bluetooth® module 1670, 3G modem 1675, GPS 1680, and Wi-Fi 1685. Note as stated above, a UE includes a radio for communication. As a result, these peripheral communication modules may not all be included. However, in a UE some form of a radio for external communication should be included.

Figure 17:
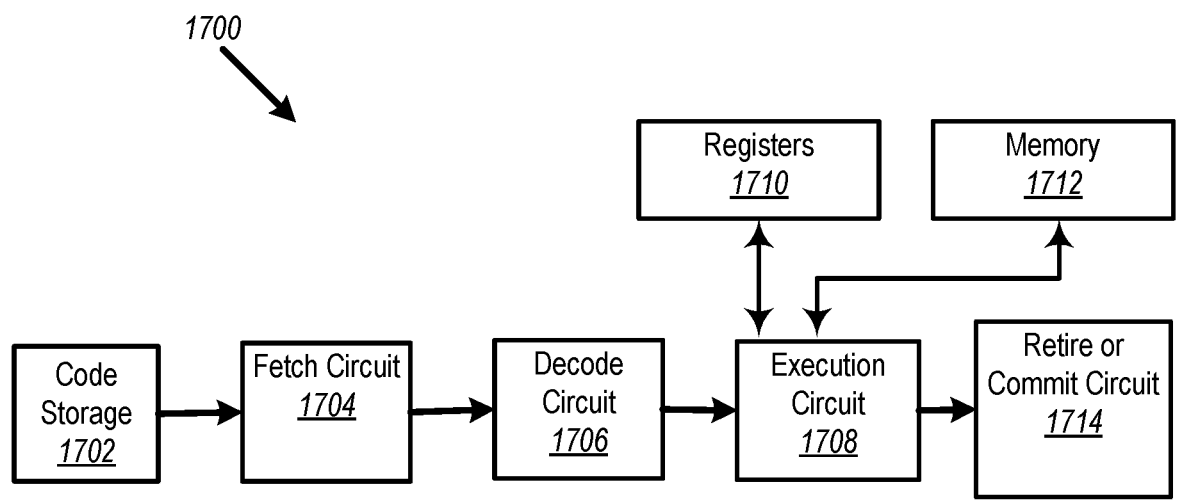
FIG. 17 is a block diagram of processing components for executing instructions that implements secure arbitration mode (SEAM) for TDX operation according to an implementation.

FIG. 17 is a block diagram of processing components for executing instructions that implements secure arbitration mode (SEAM) for TDX operation according to an implementation. As shown, computing system 1700 includes code storage 1702, fetch circuit 1704, decode circuit 1706, execution circuit 1708, registers 1710, memory 1712, and retire or commit circuit 1714. In operation, an instruction (e.g., SEAMCALL or SEAMEXIT) is to be fetched by fetch circuit 1704 from code storage 1702, which may comprise a cache memory, an on-chip memory, a memory on the same die as the processor, an instruction register, a general register, or system memory, without limitation. In one implementation, the instruction may have a format similar to that of instruction 1400 in FIG. 14. After fetching the instruction from code storage 1702, decode circuit 1706 may decode the fetched instruction, including by parsing the various fields of the instruction. After decoding the fetched instruction, execution circuit 1708 is to execute the decoded instruction. In performing the step of executing the instruction, execution circuit 1708 may read data from and write data to registers 1710 and memory 1712. Registers 1710 may include a data register, an instruction register, a vector register, a mask register, a general register, an on-chip memory, a memory on the same die as the processor, or a memory in the same package as the processor, without limitation. Memory 1712 may include an on-chip memory, a memory on the same die as the processor, a memory in the same package as the processor, a cache memory, or system memory, without limitation. After the execution circuit executes the instruction, retire or commit circuit 1714 may retire the instruction, ensuring that execution results are written to or have been written to their destinations, and freeing up or releasing resources for later use.

Figure 18:
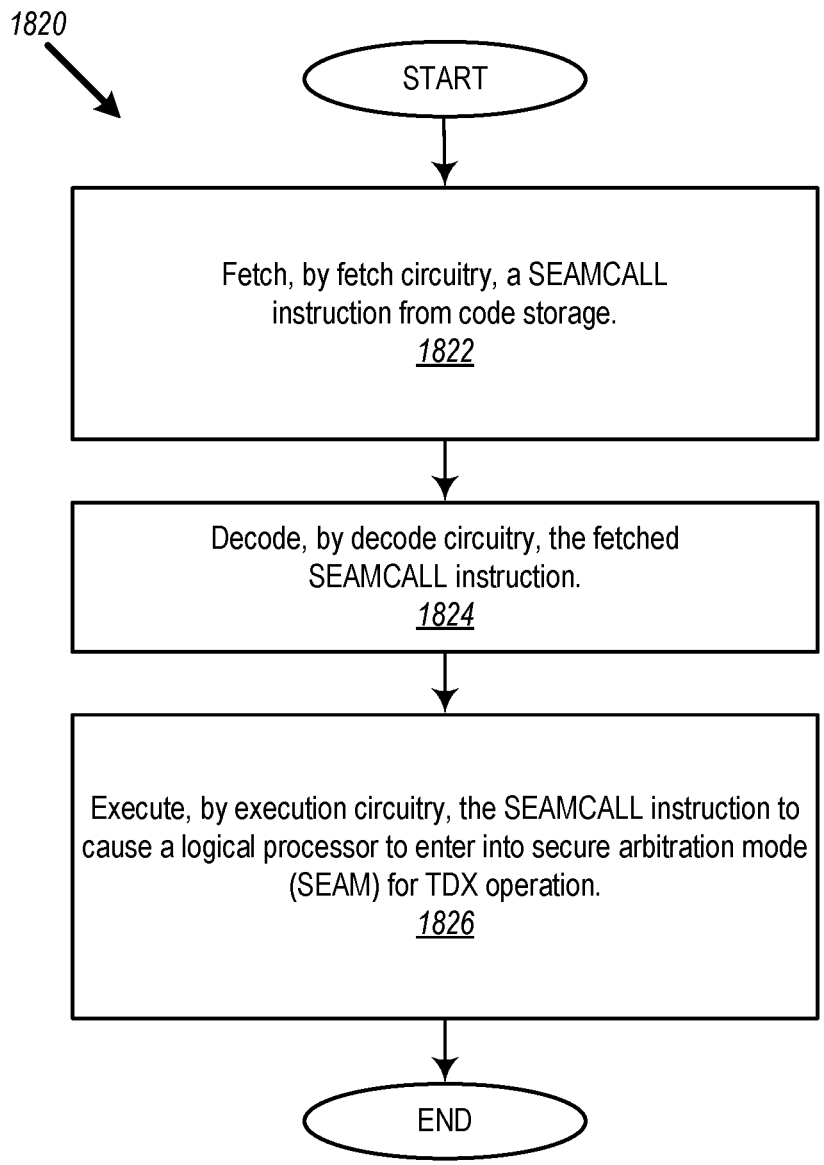
FIG. 18 is a flow diagram of an example method to be performed by a processor to execute a SEAMCALL instruction to cause a processor to enter into a trust domain (TD) according an implementation.

FIG. 18 is a flow diagram of an example method 1820 to be performed by a processor to execute a SEAMCALL instruction to cause a processor to enter into a trust domain (TD) according an implementation. After starting the process, a fetch circuit at block 1822 is to fetch the SEAM-CALL instruction from code storage. At optional block 1824, a decode circuit may decode the fetched SEAMCALL instruction. At block 1826, an execution circuit is to execute the SEAMCALL instruction to cause entry of a logical processor into secure arbitration mode (SEAM) for TDX operation. Entrance into the SEAM transfers, to the logical processor, SEAM VMX root mode operational control. Additional actions (e.g., with reference to storing a VMM state and transitioning the processor into a SEAM state) performed by the SEAMCALL instruction are discussed with reference to FIGS. 9A and 10 and are therefore not discussed here in more detail.

Figure 19:
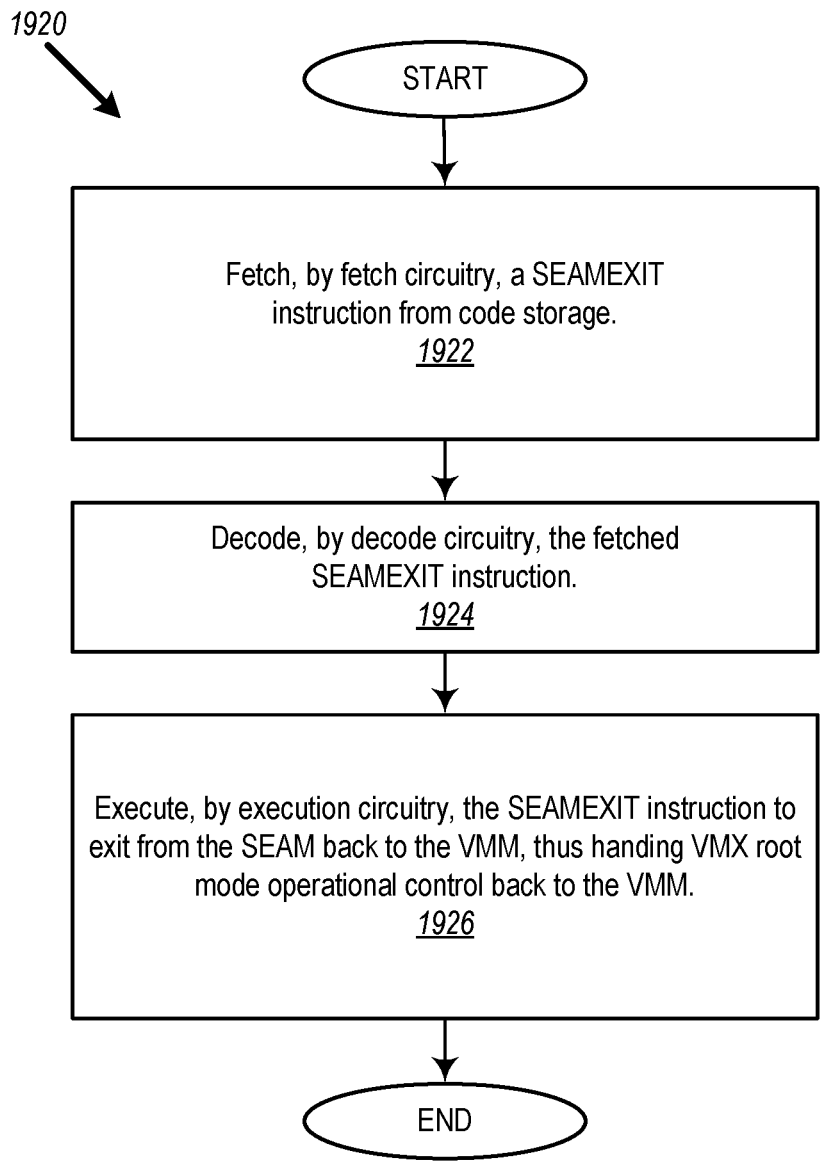
FIG. 19 is a flow diagram of an example method to be performed by a processor to execute a SEAMEXIT instruction to cause a processor to exit from a trust domain (TD) according to an implementation.

FIG. 19 is a flow diagram of an example method 1920 to be performed by a processor to execute a SEAMEXIT instruction to cause a processor to exit from a trust domain (TD) according to an implementation. After starting the process, a fetch circuit at block 1922 is to fetch the SEAMEXIT instruction from code storage. At optional block 1924, a decode circuit may decode the fetched SEAMEXIT instruction. At block 1926, an execution circuit is to execute the SEAMEXIT instruction to cause the logical processor to exit from the SEAM, and thus to transfer VMX root mode operational control back over to the VMM. Additional actions (e.g., restoring the VMM state) performed by the SEAMEXIT instruction are discussed with reference to FIG. 9B and are therefore not discussed herein in more detail.

Figure 20:
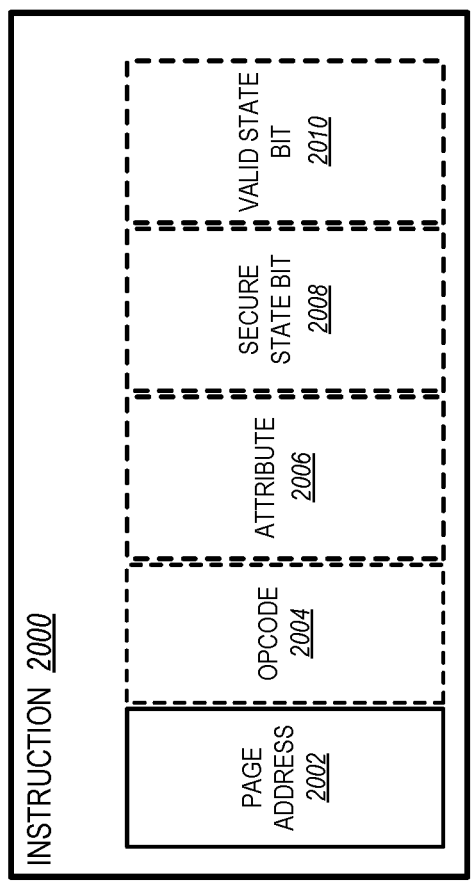
FIG. 20 is a block diagram illustrating an example format for instructions disclosed herein that implement secure arbitration mode (SEAM) for TDX operation according to an implementation.

FIG. 20 is a block diagram illustrating an example format for instructions 2000 disclosed herein that implement secure arbitration mode (SEAM) for TDX operation according to an implementation. The instruction 2000 may be a SEAMCALL or a SEAMEXIT instruction. The parameters in the format of the instruction 2000 may be different for the SEAMCALL or for the SEAMEXIT instruction. As such, some of the parameters are depicted as optional with dashed lines. In implementations, the instruction 2000 includes a page address 2002, optional opcode 2004, optional attribute 2006, optional secure state bit 2008, and optional valid state bit 2010.

Figure 21:
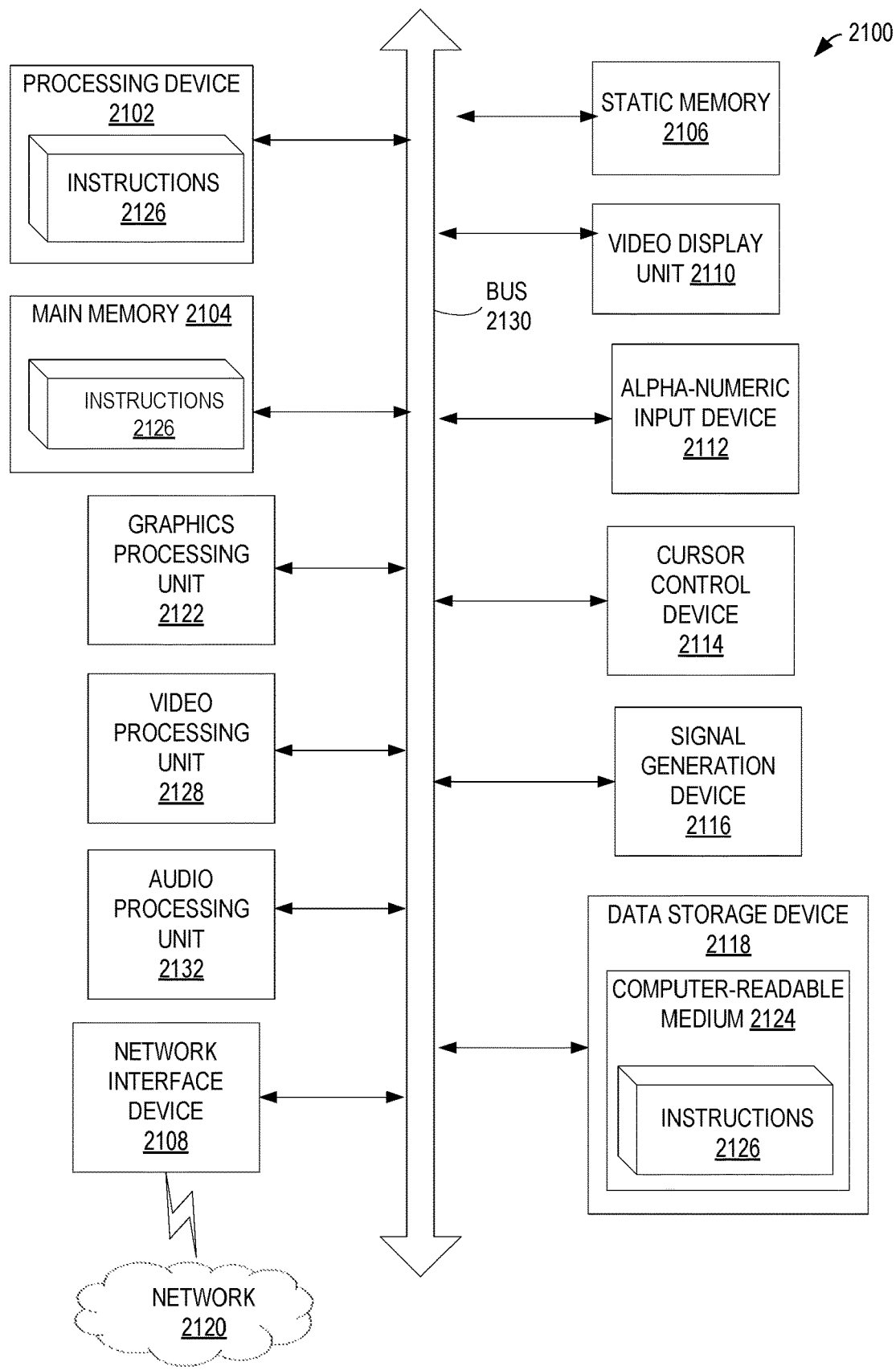
FIG. 21 illustrates a block diagram for a computing system according to another implementation.

FIG. 21 illustrates a diagrammatic representation of a machine in the example form of a computing system 2100 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 2100.

The computing system 2100 includes a processing device 2102, main memory 2104 (e.g., read-only memory (ROM), flash memory, dynamic random access memory (DRAM) (such as synchronous DRAM (SDRAM) or DRAM (RDRAM), etc.), a static memory 2106 (e.g., flash memory, static random access memory (SRAM), etc.), and a data storage device 2118, which communicate with each other via a bus 2130.

Processing device 2102 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 2102 may also be one or more special-purpose processing devices such as an application specific integrated circuit (ASIC), a field programmable gate array (FPGA), a digital signal processing device (DSP), network processing device, or the like. In one implementation, processing device 2102 may include one or processing device cores. The processing device 2102 is configured to execute instructions 2126 for performing the operations discussed herein. In one implementation, processing device 2102 may be part of the computing system 100 of FIG. 1. Alternatively, the computing system 2100 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 2100 may further include a network interface device 2108 communicably coupled to a network 2120. The computing system 2100 also may include a video display unit 2110 (e.g., a liquid crystal display (LCD) or a cathode ray tube (CRT)), an alphanumeric input device 2112 (e.g., a keyboard), a cursor control device 2114 (e.g., a mouse), a signal generation device 2116 (e.g., a speaker), or other peripheral devices. Furthermore, computing system 2100 may include a graphics processing unit 2122, a video processing unit 2128 and an audio processing unit 2132. In another implementation, the computing system 2100 may include a chipset (not illustrated), which refers to a group of integrated circuits, or chips, that are designed to work with the processing device 2102 and controls communications between the processing device 2102 and external devices. For example, the chipset may be a set of chips on a motherboard that links the processing device 2102 to very high-speed devices, such as main memory 2104 and graphic controllers, as well as linking the processing device 2102 to lower-speed peripheral buses of peripherals, such as USB, PCI or ISA buses.

The data storage device 2118 may include a computer-readable storage medium 2124 on which is stored instructions 2126 embodying any one or more of the methodologies of functions described herein. The instructions 2126 may also reside, completely or at least partially, within the main memory 2104 as instructions 2126 and/or within the processing device 2102 as processing logic during execution thereof by the computing system 2100; the main memory 2104 and the processing device 2102 also constituting computer-readable storage media.

The computer-readable storage medium 2124 may also be used to store instructions 2126 utilizing the processing device 2102, such as described with respect to FIG. 1, and/or a software library containing methods that call the above applications. While the computer-readable storage medium 2124 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a processor comprising: 1) a range register to store information that identifies a reserved range of memory associated with a secure arbitration mode (SEAM) of the processor; and 2) a processor core coupled to the range register, wherein the processor core comprises security logic to unlock the range register on a logical processor, of the processor core, that is to initiate the SEAM; and 3) wherein the logical processor, via execution of the security logic, is to: a) store, in the reserved range of the memory identified by the information stored in the range register, a SEAM module and a manifest associated with the SEAM module, wherein the SEAM module is to support execution of one or more trust domains; b) initialize a SEAM virtual machine control structure (VMCS) within the reserved range of the memory, the SEAM VMCS to control state transitions between a virtual machine monitor (VMM) and the SEAM module; and c) authenticate the SEAM module using a manifest signature of the manifest.

In Example 2, the processor of Example 1, further comprising 1) a plurality of measurement registers and 2) a security virtual number (SVN) register, wherein the security logic is further to: a) record, into the plurality of measurement registers, a measurement, an identity, and a SVN value of the SEAM module; and b) verify the SVN value against a previously recorded SVN value stored in the SVN register.

In Example 3, the processor of Example 2, wherein the manifest comprises a combination of at least two of: a) a manifest signers public key; b) a first digest of the manifest signers public key, wherein the first digest is the identity of the SEAM module that is recorded; c) a second digest of the SEAM module and associated loadable components; or d) attributes of the SEAM module; and wherein, to record the measurement of the SEAM module, the security logic is further to: e) generate a third digest of a combination of: (i) the SEAM module and associated loadable components; and (ii) the manifest signature; and f) record, in at least one of the plurality of measurement registers, the third digest as the measurement of the SEAM module.

In Example 4, the processor of Example 1, wherein the security logic is further to, in response to a request to load the SEAM module: a) generate a page table to map the reserved range of the memory; b) generate a configurable number of software-writeable page directory pointer (PDP) structures to map additional memory, the additional memory to store data of the one or more trust domains; c) store, within the reserved range of the memory, the page table and the software-writable PDP structures; and d) store a page table pointer, which points to the page table, in the SEAM VMCS to establish a SEAM state on a subsequent execution of a SEAMCALL instruction.

In Example 5, the processor of Example 1, wherein the security logic is further to: a) initialize, with a data array, a configuration area within the reserved range of the memory; and b) initialize, within the data array, multiple SEAM VMCSs comprising the SEAM VMCS, each of which is assigned to a different logical processor of the processor core, wherein to initialize the multiple VMCSs comprises to initialize fields of each VMCS.

In Example 6, the processor of Example 1, wherein the processor core is further to execute memory check firmware to: a) verify that the reserved range, which was programmed by basic input/output system (BIOS) firmware into the range register, does not overlap with other reserved ranges of the memory; b) verify that a multi-key, total memory encryption (MK-TME) engine of the processor is configured with integrity enabled; c) configure a platform-reserved encryption key of the MK-TME engine to encrypt and integrity and replay protect data stored to the reserved range of the memory; and d) mark the reserved range the memory as valid in which to store the SEAM module.

In Example 7, the processor of Example 6, further comprising a memory controller comprising the MK-TME engine, the memory controller to: a) encrypt the SEAM module, using the platform-reserved encryption key, before the SEAM module is stored into the reserved range of the memory; and b) encrypt and integrity protect, using the platform-reserved encryption key, data stored in and retrieved from the reserved range of the memory.

In Example 8, the processor of Example 1, wherein the processor core is further to execute memory check firmware to: a) partition key identifier (ID) space according to a partition set by basic input/output system (BIOS) firmware within a configuration register upon boot, wherein the key ID spaced is partitioned between at least a first range of values that identify private key IDs and a second range of values that identify shared key IDs; and b) configuration lock the key ID space via a lock on the configuration register.

In Example 9, the processor of Example 1, wherein the logical processor is to execute the VMM, wherein the VMM is to call for execution of a SEAMCALL instruction, in response to which the processor core is to: a) transfer virtual root mode operational control to the SEAM module as a virtual machine (VM) exit; and b) register a call of the secure arbitration mode as a reason for the VM exit.

In Example 10, the processor of Example 9, wherein the processor core is further to: a) store a first state of the VMM into the SEAM VMCS; b) load, into the processor from the SEAM VMCS, a second state associated with the SEAM module; c) operate in a SEAM virtual root mode using the SEAM module with the second state loaded into the processor; and d) launch, using the SEAM module, a first trust domain (TD) to run in SEAM virtual non-root mode.

In Example 11, the processor of claim 10, wherein, in response to a system management interrupt, the processor core is further to: a) cause an exit from the first TD to the SEAM virtual root mode; b) retrieve confidential data from hardware registers that are associated with operation of the first TD within the SEAM; c) store a TD state of the first TD to a TD VMCS of the first TD stored in memory; and d) turn control over to the SEAM module, which is to call for execution of a SEAMEXIT instruction to transfer virtual root mode operational control to the VMM.

Various implementations may have different combinations of the structural features described above. For instance, all optional features of the processors and methods described above may also be implemented with respect to a system described herein and specifics in the examples may be used anywhere in one or more implementations.

Example 12 is a system comprising: 1) a memory device comprising a reserved range to store a secure arbitration mode (SEAM) module, the SEAM module to support one or more trust domains (TDs); and 2) a processor coupled to the memory device and comprising a memory controller, wherein the processor is to execute the SEAM module to: a) create a TD virtual machine structure (VMCS) in the memory device, the TD VMCS associated with a first TD; b) store, in the TD VMCS, a first pointer to a shared extended page table (EPT), the shared EPT being shared with a virtual machine monitor (VMM) to access shared memory of the memory device; c) store, in the TD VMCS, a second pointer to a secure EPT, wherein the secure EPT is accessible by the SEAM module to access private memory of the memory device; and d) translate, via a walk of the secure EPT to which the first pointer is directed, a guest physical address of the first TD to a host physical address of the memory device.

In Example 13, the system of Example 12, wherein the processor is further to execute the SEAM module to: a) program a trust domain host key identifier (TD-HKID) to correspond to a private memory encryption key, wherein the private memory encryption key programmed for the TD-HKID is unknown to the VMM; and b) store a value of the TD-HKID in the TD VMCS in relation to the first TD; and c) wherein the memory controller is further to encrypt, using the private memory encryption key, data to be stored at a location in the private memory identified by the host physical address.

In Example 14, the system of Example 12, wherein the processor is further to: a) read a position bit of the second pointer from the TD VMCS; b) determine, based on a first value of the position bit, a position of an indicator bit within the guest physical address, wherein an operating system of the first TD is to set a value of the indicator bit; and c) determine a second value of the indicator bit stored at the position of the guest physical address.

In Example 15, the system of Example 14, wherein the memory controller is to: a) determine, based on the second value of the indicator bit, that the EPT is the shared EPT; b) encrypt, using a shared encryption key that is shared with the VMM, data destined for the host physical address, to generate encrypted data; and c) store the encrypted data in the memory device at the host physical address located within the shared memory of the memory device.

In Example 16, the system of Example 14, wherein the memory controller is further to: a) determine, based on the second value of the indicator bit, that the EPT is the secure EPT; b) encrypt, using a private encryption key associated with a trust domain host key identifier, data destined for the host physical address, to generate encrypted data; and c) store the encrypted data in the memory device at the host physical address located in the private memory of the memory device.

Various implementations may have different combinations of the structural features described above. For instance, all optional features of the processors and methods described above may also be implemented with respect to a system described herein and specifics in the examples may be used anywhere in one or more implementations.

Example 17 is a method comprising: 1) bootstrapping, by a processor launching an authenticated code module, a secure arbitration mode (SEAM) module into operation out of a reserved range of memory within a memory device coupled to the processor; 2) invoking, by a virtual machine monitor (VMM) being executed by the processor, a SEAM call (SEAMCALL) instruction; 3) executing, by the processor, the SEAMCALL instruction comprising: a) saving a VMM state of the processor into a guest area of a SEAM virtual machine control structure (VMCS) stored in the reserved range of the memory; b) loading and forcing a SEAM module state into the processor from a host state area of the SEAM VMCS; b) transitioning the processor to a SEAM virtual root mode of operation; and c) executing instructions in the SEAM module starting at an instruction address programmed into the SEAM VMCS; and 4) initializing, via operation of the SEAM module, a trust domain (TD) virtual machine control structure (VMCS) in the memory, the TD VMCS to support operation of a first TD.

In Example 18, the method of Example 17, further comprising 1) programming, by the SEAM module into the TD VMCS: a) a first pointer to a shared extended page table (EPT), the shared EPT being shared with the VMM to access shared memory of the memory device; b) a second pointer to a secure EPT, wherein the secure EPT is accessible by the SEAM module to access private memory of the memory device; and c) a trust domain host key identifier (TD-HKID) to correspond to a private memory encryption key, wherein the private memory encryption key programmed for the TD-HKID is unknown to the VMM.

In Example 19. the method of Example 18, further comprising 1) allowing the SEAM module to invoke second instructions that are inaccessible by the processor in operation outside of the SEAM, wherein the second instructions comprise at least one of: a) a processor configure (PCONFIG) operation that is to program the private memory encryption key to correspond to the TD-HKID; or b) inhibiting, in response to execution of the SEAMCALL instruction, a system management interrupt (SMI) and a non-maskable interrupt (NMI) of the processor.

In Example 20, the method of Example 18, further comprising, in response to the SEAM module invoking execution of a VMRESUME instruction for a first trust domain (TD): a) loading, into the processor from the TD VMCS stored in the memory device, a TD state of the first TD; and b) resuming operation of the first TD in SEAM virtual non-root mode.

In Example 21, the method of Example 20, wherein resuming operation of the first TD comprises, in response to a VM entry: 1) determining that an enable EPT VM execution control bit of the TD VMCS is of value zero; and 2) generating a VM entry failure due to an invalid control field.

In Example 22, the method of Example 20, further comprising: 1) determining that an enable EPT VM execution control bit of the TD VMCS is of value one; and 2) determining that a secure EPT pointer VM-execution control field of the TD VMCS satisfies a set of predetermined criteria.

In Example 23, the method of Example 20, wherein resuming operation of the first TD comprises verifying that the TD-HKID is non-zero and is a private key ID.

In Example 24, the method of Example 20, further comprising: 1) inhibiting, upon execution of the SEAMCALL instruction, a system management interrupt (SMI) and a non-maskable interrupt (NMI) of the processor; and 2) programming, into page miss handler (PMH) control registers of the processor, values of the first pointer and of the second pointer; and 3) wherein resuming operation of the first trust domain further comprises uninhibiting the SMI and the NMI of the processor.

In Example 25, the method of Example 20, wherein resuming operation of the first TD comprises 1) calculating, by a page miss handler (PMH) of the processor, an address space identifier (ASID) with which to tag addresses of the first TD in entries of a translation look-aside buffer (TLB), wherein calculating comprises: a) using the second pointer of the secure EPT, in lieu of the first pointer, at which to locate extended pages tables for address translation; and b) setting a trust domain (TD) bit of the ASID to indicate association with the first trust domain, wherein the TD bit makes the ASID unique to the first TD and to SEAM operation.

Various implementations may have different combinations of the structural features described above. For instance, all optional features of the processors and methods described above may also be implemented with respect to a system described herein and specifics in the examples may be used anywhere in one or more implementations.

Example 26 is a non-transitory computer-readable medium storing instructions, which when executed by a processor having a core coupled to a system memory, cause the processor to execute a plurality of logic operations comprising: 1) bootstrapping, by the processor launching an authenticated code module, a secure arbitration mode (SEAM) module into operation out of a reserved range of memory within a memory device coupled to the processor; 2) invoking, by a virtual machine monitor (VMM) being executed by the processor, a SEAM call (SEAMCALL) instruction; 3) executing, by the processor, the SEAMCALL instruction comprising: a) saving a VMM state of the processor into a guest area of a SEAM virtual machine control structure (VMCS) stored in the reserved range of the memory; b) loading and forcing a SEAM module state into the processor from a host state area of the SEAM VMCS; b) transitioning the processor to a SEAM virtual root mode of operation; and c) executing instructions in the SEAM module starting at an instruction address programmed into the SEAM VMCS; and 4) initializing, via operation of the SEAM module, a trust domain (TD) virtual machine control structure (VMCS) in the memory, the TD VMCS to support operation of a first TD.

In Example 27, the non-transitory computer-readable medium of Example 26, wherein the operations further comprise: 1) programming, by the SEAM module into the TD VMCS: a) a first pointer to a shared extended page table (EPT), the shared EPT being shared with the VMM to access shared memory of the memory device; b) a second pointer to a secure EPT, wherein the secure EPT is accessible by the SEAM module to access private memory of the memory device; and c) a trust domain host key identifier (TD-HKID) to correspond to a private memory encryption key, wherein the private memory encryption key programmed for the TD-HKID is unknown to the VMM.

In Example 28, the non-transitory computer-readable medium of Example 27, wherein the operations further comprise 1) allowing the SEAM module to invoke second instructions that are inaccessible by the processor in operation outside of the SEAM, wherein the second instructions comprise at least one of: a) a processor configure (PCONFIG) operation that is to program the private memory encryption key to correspond to the TD-HKID; or b) inhibiting, in response to execution of the SEAMCALL instruction, a system management interrupt (SMI) and a non-maskable interrupt (NMI) of the processor.

In Example 29, the non-transitory computer-readable medium of Example 27, wherein the operations further comprise, in response to the SEAM module invoking execution of a VMRESUME instruction for a first trust domain (TD): a) loading, into the processor from the TD VMCS stored in the memory device, a TD state of the first TD; and b) resuming operation of the first TD in SEAM virtual non-root mode.

In Example 30, the non-transitory computer-readable medium of Example 29, wherein resuming operation of the first TD comprises, in response to a VM entry: 1) determining that an enable EPT VM execution control bit of the TD VMCS is of value zero; and 2) generating a VM entry failure due to an invalid control field.

In Example 31, the non-transitory computer-readable medium of Example 29, wherein the operations further comprise: 1) determining that an enable EPT VM execution control bit of the TD VMCS is of value one; and 2) determining that a secure EPT pointer VM-execution control field of the TD VMCS satisfies a set of predetermined criteria.

In Example 32, the non-transitory computer-readable medium of Example 29, wherein resuming operation of the first TD comprises verifying that the TD-HKID is non-zero and is a private key ID.

In Example 33, the non-transitory computer-readable medium of Example 29, wherein the operations further comprise: 1) inhibiting, upon execution of the SEAMCALL instruction, a system management interrupt (SMI) and a non-maskable interrupt (NMI) of the processor; and 2) programming, into page miss handler (PMH) control registers of the processor, values of the first pointer and of the second pointer; and 3) wherein resuming operation of the first trust domain further comprises uninhibiting the SMI and the NMI of the processor.

In Example 34, the non-transitory computer-readable medium of Example 20, wherein resuming operation of the first TD comprises 1) calculating, by a page miss handler (PMH) of the processor, an address space identifier (ASID) with which to tag addresses of the first TD in entries of a translation look-aside buffer (TLB), wherein calculating comprises: a) using the second pointer of the secure EPT, in lieu of the first pointer, at which to locate extended pages tables for address translation; and b) setting a trust domain (TD) bit of the ASID to indicate association with the first trust domain, wherein the TD bit makes the ASID unique to the first TD and to SEAM operation.

Various implementations may have different combinations of the structural features described above. For instance, all optional features of the processors and methods described above may also be implemented with respect to a system described herein and specifics in the examples may be used anywhere in one or more implementations.

Example 35 is a system comprising: 1) means for storing a secure arbitration mode (SEAM) module, the SEAM module to support one or more trust domains (TDs); and 2) means for executing the SEAM module to: a) create a TD virtual machine structure (VMCS) in the memory device, the TD VMCS associated with a first TD; b) store, in the TD VMCS, a first pointer to a shared extended page table (EPT), the shared EPT being shared with a virtual machine monitor (VMM) to access shared memory of the memory device; c) store, in the TD VMCS, a second pointer to a secure EPT, wherein the secure EPT is accessible by the SEAM module to access private memory of the memory device; and d) translate, via a walk of the secure EPT to which the first pointer is directed, a guest physical address of the first TD to a host physical address of the memory device.

In Example 36, the system of Example 35, further comprising: 1) means for executing the SEAM module to: a) program a trust domain host key identifier (TD-HKID) to correspond to a private memory encryption key, wherein the private memory encryption key programmed for the TD-HKID is unknown to the VMM; and b) store a value of the TD-HKID in the TD VMCS in relation to the first TD; and c) means for encrypting, using the private memory encryption key, data to be stored at a location in the private memory identified by the host physical address.

In Example 37, the system of Example 35, further comprising: a) means for reading a position bit of the second pointer from the TD VMCS; b) means for determining, based on a first value of the position bit, a position of an indicator bit within the guest physical address, wherein an operating system of the first TD is to set a value of the indicator bit; and c) means for determining a second value of the indicator bit stored at the position of the guest physical address.

In Example 38, the system of Example 37, further comprising: a) means for determining, based on the second value of the indicator bit, that the EPT is the shared EPT; b) means for encrypting, using a shared encryption key that is shared with the VMM, data destined for the host physical address, to generate encrypted data; and c) means for storing the encrypted data in the memory device at the host physical address located within the shared memory of the memory device.

In Example 39, the system of Example 37, further comprising: a) means for determining, based on the second value of the indicator bit, that the EPT is the secure EPT; b) means for encrypting, using a private encryption key associated with a trust domain host key identifier, data destined for the host physical address, to generate encrypted data; and c) means for storing the encrypted data in the memory device at the host physical address located in the private memory of the memory device.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing co-existence of trust domain architecture with multi-key total memory encryption technology in virtualized systems using trust domains in specific integrated circuits, such as in computing platforms or microprocessing devices.

The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   decode circuitry to decode a SEAMCALL instruction for a virtual machine monitor (VMM) in legacy virtual machine extensions (VMX) root operation mode; and
   execution circuitry to perform operations corresponding to the SEAMCALL instruction, including to:
   cause a virtual machine (VM) exit;
   transition the processor from the legacy VMX root operation mode to a secure arbitration mode (SEAM) VMX root operation mode, wherein a SEAM module is to be hosted in the SEAM VMX root operation mode;
   store a VMM state of the processor to a virtual machine control structure (VMCS);
   load a SEAM module state of the processor from the VMCS;
   inhibit system management interrupts (SMI) and non-maskable interrupts (NMI) in the SEAM VMX root operation mode; and
   invoke the SEAM module.

2. The processor of claim 1, wherein the execution circuitry, to invoke the SEAM module, is to invoke execution of instructions to create a trust domain (TD).

3. The processor of claim 1, wherein the execution circuitry, to invoke the SEAM module, is to invoke execution of instructions to add a page to a TD.

4. The processor of claim 1, wherein the execution circuitry, to invoke the SEAM module, is to invoke execution of instructions to enter into a TD.

5. The processor of claim 1, further comprising a memory storing the SEAM module, the SEAM module including instructions, which if executed by the processor, are to cause the processor to perform operations including to create a TD, to add a page to the TD, and to enter into the TD.

6. The processor of claim 1, wherein the execution circuitry, to perform the operations corresponding to the SEAMCALL instruction, is to indicate a reason for the VM exit as being SEAMCALL.

7. The processor of claim 1, further comprising a range register to store information to identify a reserved range of memory, the reserved range of memory to store the SEAM module.

8. The processor of claim 1, further comprising registers to store a measurement of the SEAM module and a security-version number (SVN) of the SEAM module.

9. The processor of claim 1, wherein the SEAM module is trusted by a TD but the VMM is not trusted by the TD.

10. The processor of claim 1, wherein the SEAM module is attested by the processor.

11. A system comprising:
    a system memory; and
    a processor coupled with the system memory, the processor comprising:
    decode circuitry to decode a SEAMCALL instruction for a virtual machine monitor (VMM) in legacy virtual machine extensions (VMX) root operation mode; and
    execution circuitry to perform operations corresponding to the SEAMCALL instruction, including to:
    cause a virtual machine (VM) exit;
    transition the processor from the legacy VMX root operation mode to a secure arbitration mode (SEAM) VMX root operation mode, wherein a SEAM module is to be hosted in the SEAM VMX root operation mode;
    store a VMM state of the processor to a virtual machine control structure (VMCS);

load a SEAM module state of the processor from the VMCS;
inhibit system management interrupts (SMI) and non-maskable interrupts (NMI) in the SEAM VMX root operation mode; and
invoke the SEAM module.

12. The system of claim 11, further comprising:
a range register to store information to identify a reserved range of memory, the reserved range of memory to store the SEAM module; and
registers to store a measurement of the SEAM module and a security-version number (SVN) of the SEAM module.

13. The system of claim 12, wherein the execution circuitry, to invoke the SEAM module, is to invoke execution of instructions to add a page to a TD.

14. The system of claim 11, wherein the execution circuitry, to invoke the SEAM module, is to invoke execution of instructions to create a trust domain (TD), and wherein the SEAM module is trusted by a TD but the VMM is not trusted by the TD.

15. The system of claim 14, wherein the execution circuitry, to invoke the SEAM module, is to invoke execution of instructions to enter into a TD.

16. The system of claim 11, further comprising a memory storing the SEAM module, the SEAM module including instructions, which if executed by the processor, are to cause the processor to perform operations including to create a TD, to add a page to the TD, and to enter into the TD.

17. The system of claim 16, wherein the execution circuitry, to perform the operations corresponding to the SEAMCALL instruction, is to indicate a reason for the VM exit as being SEAMCALL, and wherein the SEAM module is attested by the processor.

18. A method comprising:
decoding a SEAMCALL instruction for a virtual machine monitor (VMM) in legacy virtual machine extensions (VMX) root operation mode; and
performing operations corresponding to the SEAMCALL instruction, including:
causing a virtual machine (VM) exit;
transitioning a processor used to perform the operations from the legacy VMX root operation mode to a secure arbitration mode (SEAM) VMX root operation mode, wherein a SEAM module is hosted in the SEAM VMX root operation mode;
storing a VMM state of the processor to a virtual machine control structure (VMCS);
loading a SEAM module state of the processor from the VMCS;
inhibiting system management interrupts (SMI) and non-maskable interrupts (NMI) in the SEAM VMX root operation mode; and
invoking the SEAM module.

19. The method of claim 18, further comprising storing information in a range register to identify a reserved range of memory to be used to store the SEAM module.

20. The method of claim 19, wherein invoking the SEAM module includes performing instructions that create a trust domain (TD).

21. The method of claim 18, wherein invoking the SEAM module includes performing instructions that add a page to a TD.

22. The method of claim 21, further comprising storing a measurement of the SEAM module and storing a security-version number (SVN) of the SEAM module in a plurality of registers.

23. The method of claim 22, further comprising the processor attesting the SEAM module.

24. The method of claim 23, wherein invoking the SEAM module includes performing instructions that enter into a TD, and further comprising indicating a reason for the VM exit as being SEAMCALL.

* * * * *